United States Patent
Wang et al.

(10) Patent No.: US 10,630,468 B1
(45) Date of Patent: Apr. 21, 2020

(54) DISTRIBUTED MULTI-PARTY SECURITY MODEL TRAINING FRAMEWORK FOR PRIVACY PROTECTION

(71) Applicant: Alibaba Group Holding Limited, George Town (KY)

(72) Inventors: Huazhong Wang, Hangzhou (CN); Shan Yin, Hangzhou (CN); Pengfei Ying, Hangzhou (CN)

(73) Assignee: Alibaba Group Holding Limited, George Town (KY)

( * ) Notice: Subject to any disclaimer, the term of this patent is extended or adjusted under 35 U.S.C. 154(b) by 0 days.

(21) Appl. No.: 16/448,739

(22) Filed: Jun. 21, 2019

Related U.S. Application Data

(63) Continuation of application No. PCT/CN2019/071402, filed on Jan. 11, 2019.

(51) Int. Cl.
| | | |
|---|---|---|
| *H04L 9/08* | (2006.01) | |
| *G06N 20/00* | (2019.01) | |
| *H04L 9/00* | (2006.01) | |

(52) U.S. Cl.
CPC .............. *H04L 9/085* (2013.01); *G06N 20/00* (2019.01); *H04L 9/008* (2013.01); *H04L 2209/46* (2013.01)

(58) Field of Classification Search
None
See application file for complete search history.

(56) References Cited

U.S. PATENT DOCUMENTS

| | | | |
|---|---|---|---|
| 6,363,154 B1 | 3/2002 | Peyravian et al. | |
| 8,473,537 B2 * | 6/2013 | Rane ...................... | G06F 7/5057 708/441 |
| 8,756,410 B2 * | 6/2014 | Raykova ................. | H04L 9/085 380/28 |
| 9,521,124 B2 * | 12/2016 | Raykova ................. | H04L 9/008 |

(Continued)

FOREIGN PATENT DOCUMENTS

| | | |
|---|---|---|
| CN | 103596295 | 2/2014 |
| CN | 105282122 | 1/2016 |

(Continued)

OTHER PUBLICATIONS

Komarek et al.; Making Logistic Regression A Core Data Mining Tool; 2005; Retrieved from the Internet URL, https://www.ri.cmu.edu/pub_files/pub4/komarek_paul_2005_1/komarek_paul_2005_1.pdf; pp. 1-13, as printed. (Year: 2005).*

(Continued)

*Primary Examiner* — Aravind K Moorthy
*Assistant Examiner* — Michael W Chao
(74) *Attorney, Agent, or Firm* — Fish & Richardson P.C.

(57) ABSTRACT

Methods, systems, and apparatus, including computer programs encoded on computer storage media, for training a multi-party secure logistic regression model (SLRM). One of the methods includes receiving, at a plurality of secure computation nodes (SCNs), a plurality of random numbers from a random number provider; encrypting, at each SCN, data stored at the SCN using the received random numbers; iteratively updating a secure logistic regression model (SLRM) by using the encrypted data from each SCN; and after iteratively updating the SLRM, outputting a result of the SLRM, wherein the result is configured to enable a service to be performed by each SCN.

18 Claims, 11 Drawing Sheets

(56) References Cited

U.S. PATENT DOCUMENTS

| | | | |
|---|---|---|---|
| 10,198,399 B1* | 2/2019 | Fritchman | G06N 5/04 |
| 10,320,752 B2* | 6/2019 | Hardy | G06F 21/6254 |
| 10,423,806 B2* | 9/2019 | Cerezo Sanchez | G06F 17/2705 |
| 2004/0083452 A1* | 4/2004 | Minor | G16B 40/00 717/109 |
| 2006/0107070 A1* | 5/2006 | Rice | G06F 21/14 713/190 |
| 2006/0276995 A1* | 12/2006 | Breitgand | H04L 41/00 702/179 |
| 2011/0131222 A1* | 6/2011 | DiCrescenzo | H04L 9/0894 707/757 |
| 2012/0233460 A1* | 9/2012 | Kamara | H04L 9/3218 713/168 |
| 2013/0273543 A1* | 10/2013 | Gudmundsson | C12Q 1/6886 435/6.11 |
| 2015/0019912 A1* | 1/2015 | Darling | G06F 11/2257 714/26 |
| 2016/0078446 A1* | 3/2016 | Trostle | G06Q 20/4016 705/75 |
| 2017/0310643 A1* | 10/2017 | Hardy | G06F 21/6254 |
| 2018/0218171 A1* | 8/2018 | Bellala | G06N 20/00 |
| 2018/0219842 A1* | 8/2018 | Bellala | H04L 63/061 |
| 2018/0314941 A1* | 11/2018 | Lie | G06N 3/08 |
| 2018/0373834 A1* | 12/2018 | Cho | G16B 50/30 |
| 2019/0073608 A1* | 3/2019 | Veeningen | G06F 16/285 |
| 2019/0114530 A1* | 4/2019 | Nishida | G06N 3/08 |
| 2019/0266343 A1* | 8/2019 | Parida | H04L 63/0478 |
| 2019/0268163 A1* | 8/2019 | Nadeau | H04L 9/0643 |
| 2019/0340534 A1* | 11/2019 | McMahan | G06F 17/18 |

FOREIGN PATENT DOCUMENTS

| | | |
|---|---|---|
| EP | 3401828 | 11/2018 |
| WO | WO 2018091071 | 5/2018 |

OTHER PUBLICATIONS

Jiang et al.; SecureLR: Secure Logistic Regression Model via a Hybrid Cryptographic Protocol; 2018; Retrieved from the Internet, URL, https://www.researchgate.net/profile/Yongsoo_Song; pp. 1-13, as printed. (Year: 2018).*

Du et al.; A practical approach to solve Secure Multi-party Computation problems; 2002; Retrieved from the Internet URL https://dl.acm.org/citation.cfm?id=844125; pp. 1-9, as printed. (Year: 2002).*

Crosby et al., "BlockChain Technology: Beyond Bitcoin," Sutardja Center for Entrepreneurship & Technology Technical Report, Oct. 16, 2015, 35 pages.

Nakamoto, "Bitcoin: A Peer-to-Peer Electronic Cash System," www.bitcoin.org, 2005, 9 pages.

PCT International Search Report and Written Opinion in International Application No. PCT/CN2019/071402, dated Sep. 25, 2019, 6 pages.

duVerle et al., "Privacy-Preserving Statistical Analysis by Exact Logistic Regression", 2015 IEEE Security and Privacy Workshops, May 21, 2015, 10 pages.

Extended European Search Report issued in European Application No. 19717099.6, dated Feb. 10, 2020, 9 pages.

* cited by examiner

US 10,630,468 B1

DISTRIBUTED MULTI-PARTY SECURITY MODEL TRAINING FRAMEWORK FOR PRIVACY PROTECTION

CROSS-REFERENCE TO RELATED APPLICATIONS

This application is a continuation of PCT Application No. PCT/CN2019/071402, filed on Jan. 11, 2019, which is hereby incorporated by reference in its entirety.

BACKGROUND

Machine learning is a subset of data science that uses statistical models to draw insights and make predictions. To facilitate data exchange and cooperation, different parties may work together to establish a machine learning model. Traditional machine learning projects aggregate training data obtained from multiple parties in one place. Then, in the training phase of the machine learning process, a training model is built using machine learning tools based on the aggregated data, so that the model can be uniformly trained. The training data may be aggregated by any participating party, or at a third party that is trusted and selected by all participating parties.

SUMMARY

The present disclosure describes a distributed multi-party security model training framework for privacy protection.

In general, one innovative aspect of the subject matter described in this specification can be embodied in methods that include the actions of receiving, at a plurality of secure computation nodes (SCNs), a plurality of random numbers from a random number provider; encrypting, at each SCN, data stored at the SCN using the received random numbers; iteratively updating a secure logistic regression model (SLRM) by using the encrypted data from each SCN; and after iteratively updating the SLRM, outputting a result of the SLRM, wherein the result is configured to enable a service to be performed by each SCN. Other embodiments of this aspect include corresponding computer systems, apparatus, and computer programs recorded on one or more computer storage devices, each configured to perform the actions of the methods.

The foregoing and other embodiments can each optionally include one or more of the following features, alone or in combination. In particular, one embodiment includes all the following features in combination.

This specification also provides one or more non-transitory computer-readable storage media coupled to one or more processors and having instructions stored thereon which, when executed by the one or more processors, cause the one or more processors to perform operations in accordance with implementations of the methods provided herein.

This specification further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with this specification may include any combination of the aspects and features described herein. That is, methods in accordance with this specification are not limited to the combinations of aspects and features specifically described herein, but also include any combination of the aspects and features provided.

The details of one or more implementations of this specification are set forth in the accompanying drawings and the description below. Other features and advantages of this specification will be apparent from the description and drawings, and from the claims.

DETAILED DESCRIPTION

Figure 1:
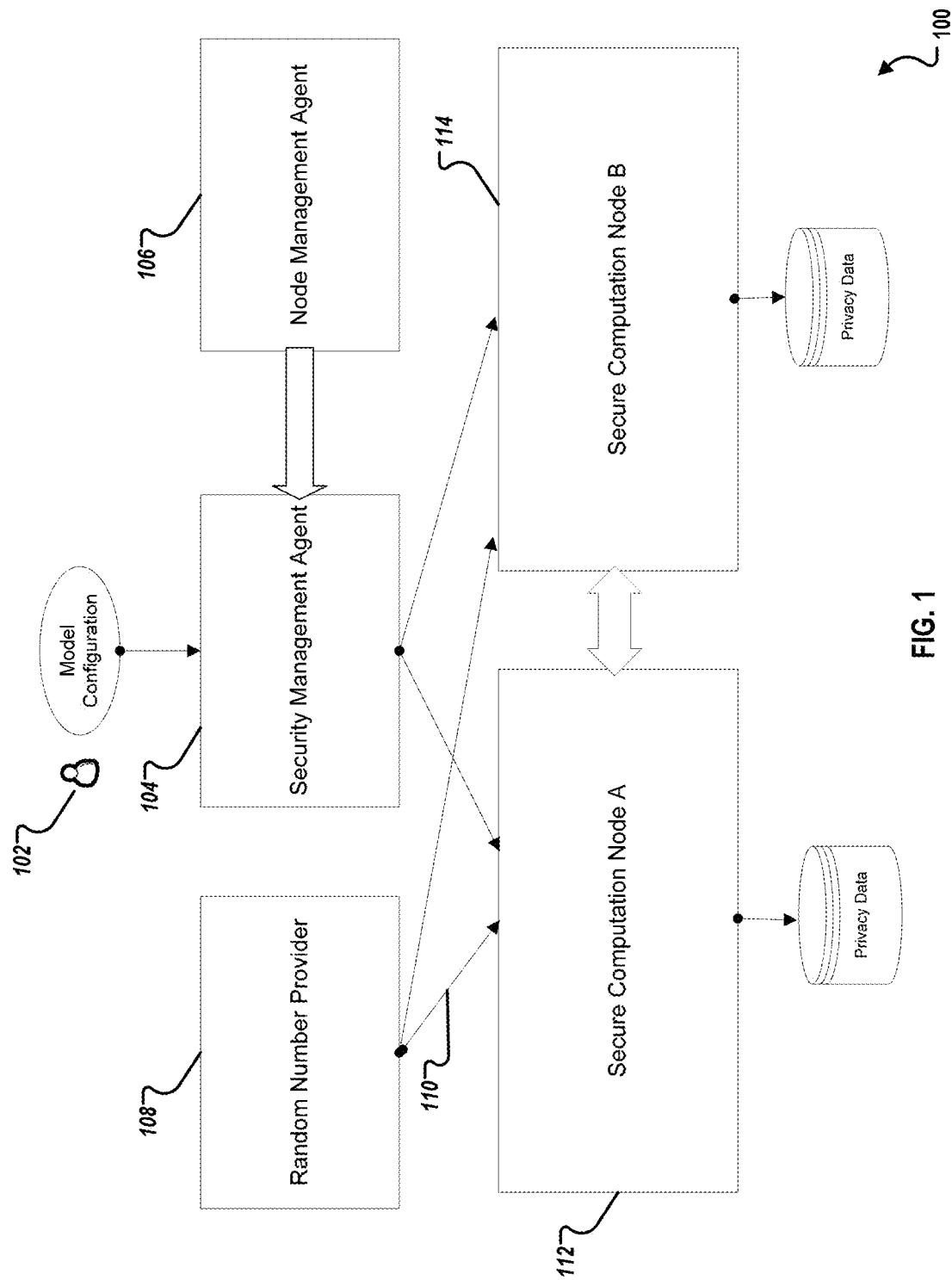
FIG. 1 depicts an example of an environment for training a multi-party machine-learning secure logistic regression model (SLRM) using secrete sharing in accordance with implementations of the present specification.

The following detailed description describes a distributed multi-party security model training framework for privacy protection, and is presented to enable any person skilled in the art to make and use the disclosed subject matter in the context of one or more particular implementations. Various modifications, alterations, and permutations of the disclosed implementations can be made and will be readily apparent to those of ordinary skill in the art, and the general principles defined may be applied to other implementations and applications, without departing from the scope of the disclosure. In some instances, details unnecessary to obtain an understanding of the described subject matter may be omitted so as to not obscure one or more described implementations with unnecessary detail and inasmuch as such details are within the skill of one of ordinary skill in the art. The present disclosure is not intended to be limited to the described or illustrated implementations, but to be accorded the widest scope consistent with the described principles and features.

Large sets of information about consumers, sometimes referred to as "big data," are being leveraged to provide better understanding of consumer habits, better targeting for marketing campaigns, improved operation efficiency, lower costs, and reduced risk, along with other benefits. With the technological advancements of the big data ecosystem, data exchange and cooperation between different organizations has become more frequent, refined and complicated. As such, some organizations have established cooperative data labs to build a secure data training model and to facilitate data exchange between organizations. During the data cooperation process, a machine learning model is built based on data obtained from different participating organizations. Organizations can aggregate their data and physically place the aggregated data in one place, and then use a mature machine learning tool to build a model based on the aggregated data. The aggregated data can be stored at a participating organization, or at a third-party that is trusted by all participants.

Machine learning schemes based on homomorphic encryption or differential privacy can be implemented to train such models to ensure data privacy protection. For example, the machine learning scheme that based on homomorphic or micromorphic encryption allows the data from both parties to be fully homomorphically encrypted, and then aggregates the encrypted data together to complete the model training based on the ciphertext. Because the encryption is homomorphic, the model training will produce encrypted results that, when decrypted, will match the training results that would be obtained from training with the unencrypted training data. The output results of the model training are returned to the participating parties so that they can decrypt and obtain the final results.

Various problems exist in the current data cooperation technologies. First, under the current approach, each party needs to expose its own data to other parties, creating data privacy leakage risk, especially for highly sensitive data. Second, although many data labs have implemented techniques such as cloud computing, multi-tenant separation, data desensitization, data auditing, etc. to ensure data privacy, parties are still not assured with a security guarantee after data left their domain. As such, the selection of a participating party or a neutral third party to aggregate data and process the aggregated data can be difficult due to the lack of trust between parties. Third, even if both parties trust each other and agree to the sample output, because the industry lacks standards and guidelines for data cooperation, the level of security of which technology implemented by each party can be different, resulting a large amount of time and communication cost for sample data encryption, data desensitization, data collision, security approval, etc. Fourth, the machine learning scheme that based on homomorphic encryption or differential privacy is still a centralized modeling solution which is inefficient and generates inaccurate outputs in engineering implementations. For example, the computational speed of the machine learning scheme based on homomorphic encryption is slow. The current homomorphic technology is not mature and still presents issues such as long training time, low work efficiency, complicated encryption key management, etc. Likewise, although the machine leaning scheme based on the differential privacy may reduce the risk of privacy leakage for data used in the data cooperation process, the resulting model suffers a loss of accuracy and precision due to the transformation of the data. Fifth, traditional modeling tools and processes, although powerful, are demanding for modelers and requires significant time and effort to build the training models.

Implementations of this disclosure introduce a new approach of training SLRM by using SS and an even-driven interactive secure modeling procedure. The described implementations apply an SLRM model that based on logistic regression and can be iteratively updated by feeding training data received from both parties. Logistic regression is a generalized linear regression and is one type of classification and prediction algorithms. The logistic regression algorithm estimates discrete values from a series known dependent variables and estimates the probability of the occurrence of an event by fitting the data into a logic function. Logistic regression is mainly used for classification, such as spam email classification, credit risk prediction classification, etc.

The sources of the sample training data are independent secure computation nodes (SCNs), and each SCN keeps its training data secret from other nodes using a secret sharing (SS) scheme. As previously described, since the training data is supplied by different SCNs, securing the training data for sharing between the SCNs becomes very important. Specifically, to consolidate such cooperation, the described techniques introduce random numbers to enable each SCN to protect its private training data from the other SCNs. The described techniques can address problems such as lack of mutual trust between parties in the data cooperation process, prevent leakage of training data received from both parties, and effectively promote cooperation between parties in building a machine learning model.

In addition, the sharing of training data between the SCNs can be controlled by an event-driven integrative secure modeling procedure. In some implementations, the event-driven interactive secure modeling procedure is based on an event-driven model (or so-called "publish-subscribe" model). This model can separate parties who rely on each other to complete its own task. By using this model, both parties can focus on its own service process. One party (the "publisher") sends a notice when its service process is completed. The other party (the "subscriber") monitors for the notification, and once the notification is received, its service process can be triggered accordingly. During the training process, each SCN maintains a message queue to receive data from the other party and in response, triggers corresponding modeling steps to carry on the SLRM.

The described techniques can have a variety of applications. For example, the techniques can be applied in data cooperation between financial institutions, financial institutions and a government entity, or other organizations.

In some implementations, the disclosed framework uses a secure logistic regression model (SLRM) and a secret sharing (SS) scheme. The SS scheme is a type of encryption used in scenarios involving multi-party collaboration. In an SS scheme, a secret (e.g., an encryption key or data set) is divided to several different shares in a predetermined manner, and each share is provided to a different participating party. The secret cannot be recovered or restored by a single participating party, in this way, the secrecy and security of the secret are ensured. For the purpose of this disclosure, the algorithm used protect the training used by the SLRM is not limited to SS. Compared with homomorphic encryption, the overall computational efficiency is greatly improved by using secret sharing. Further because the raw training data is not transformed, the training process is an accurate computation based on the raw training data, and the output model result of the training is an accurately trained model based on the raw training data.

In some implementations, a distributed model training framework is implemented and the framework introduces an independent third-party random number service. In these implementations, before any raw data is input to the training model, it goes through a computation process in conjunction with the random numbers generated and distributed by the third-party random number service. In such implementations, an event-driven interactive secure procedure is further adopted to improve the efficiency of the distributed model. In this way, information leakage of the raw data can be prevented, and the integrity of the modeling result and the precision of the model are ensured.

FIG. 1 depicts an example of an environment 100 for training a multi-party machine-learning secure logistic regression model (SLRM) using secrete sharing in accordance with implementations of the present specification. The data cooperation service can be carried out by one or more servers that provide organizations with a platform/environment for data cooperation. The example environment 100 includes a user 102, a security management agent 104, a node management agent 106, a random number provider 108, a network 110, and at least two secure computation nodes (SCN) SCN A 112 and SCN B 114 The example environment 100 can include additional users, secure computation node computers, networks, systems, or other components. The environment 100 can be configured in another manner in some implementations.

In some implementations, the network 110 includes a local area network (LAN), wide area network (WAN), the Internet, or a combination of these or other networks. The network 110 can include one or more of a wireless network or wireline networks. The network 110 connects computing devices (e.g., the servers 104-108) and secure computation nodes (e.g., the SCNs 112, 114). In some implementations, the network 110 can be accessed over a wired and/or a wireless communications link.

In some cases, prior to the start of the training process, a user 102 can predetermine various parameters and settings associated with the SLRM. These parameters may include, for example, the size of the training data, features of the training data and corresponding data processing settings, or a hyperparameter (i.e., a parameter of a prior distribution) of the model. After initializing the model settings, information associated with the model is sent to the security management agent 104, which can subsequently coordinate with the SCNs to complete the specific modeling logic.

In some implementations, the security management agent 104 and the node management agent 106 can be integrated as a single component to manage and control the modeling process, as well as the SCNs (e.g., 112, 114) participating in the process. The security management agent 104 and the node management agent 106 may also be separate components, as shown in FIG. 1.

In some implementations, the security management agent 104 may be configured to manage training of the SLRM, including configuration, modeling, iterative computation, and process management of the training model. Specifically, the security management agent 104 can facilitate the modeling process jointly carried out by the SCNs 112, 114, including, for example, initializing each iteration cycle, and determining whether the training model is converged after a number of iteration circles. In addition, the security management agent 104 can also obtain specific data structure and other information associated with the training data from each SCN. For example, obtaining information such as the source of training data, features of the training data (e.g., the number of rows and columns of each training data set).

In some implementations, the node management agent 106 can be configured to perform node selection, node management, project data management, etc. For example, once the security management agent 104 received modeling requests from SCN A 112 and SCN B 114, and collected corresponding data information of SCNs A and B, the node management agent 106 can inform, through the security management agent 104, each SCN that the identity of other SCN(s) it needs to work with, the location to obtain additional training data, and distribute corresponding parameters to each SCN participate in the training process. In addition, the node management agent 106 also notifies SCNs A and B the location of the random number provider 108.

In the depicted example, the SCN A 112 and SCN B 114 can be operated by separate organizations possessing data sets about their separate users seeking to facilitate data exchange or data cooperation with each other. For example, the organizations operating SCN A 112 and SCN B 114 may possess training data sets P0 and P1, respectively, with both P0 and P1 being inputs to a machine learning model. The output result of the training model can be, for example, a prediction result that can be used by both SCN A 112 and SCN B 114 to carry out a certain service, such as, a prediction of the risk of issuing a loan to a customer of SCN A 112 or SCN B 114. After SCNs A 112 and B 114 received the model parameters and settings from the security management agent 104, they need to complete the modeling task through network communications with each other. For security purpose, especially in cases where the training data owned by each SCN is highly sensitive privacy data, SCNs A 112 and B 114 can hide or obfuscate portions of the training data from each other. To obfuscate the training data, SCNs A 112 and B 114 can request random numbers from the random number provider 108, and perform computations using its own training data and the received random numbers (for example, addition or multiplication of the random numbers and portions of the data). The random numbers can be used to provide data obfuscation or encryption of the training data. In some cases, only portions of the training data containing highly sensitive privacy data (e.g., personal information of users) can be obfuscated or encrypted, thereby allowing the other party to use the non-sensitive portions of the data for training while not allowing the other party access to the highly sensitive privacy data. Any suitable encryption scheme can be used, such as RSA, DES/TripleDES, and other well-known encryption schemes. In some implementations, the random number can be a number, a vector, or a matrix, etc. In some implementations, the random number can be generated by either SCN 112, 114. In some implementations, the random numbers can be provided by an independent third party to ensure that no private data can be revealed by the other SCN during sharing and training. In some implementations, services related to the random number provider 108, security management agent 104, and node management agent 106 can be provided and performed by a mutual selected and trusted third party agent.

For each SCN, after the data is encrypted by using the random numbers, the encrypted data can be sent to the other SCN. Because data transmitted between the SCNs 112, 114 is encrypted, sensitive information of the data is not exposed. In some implementations, computations results from SCNs A and B 112, 114 are used for the machine learning model training. Specifically, each SCN uses the received encrypted data as inputs to the SLRM, to iteratively update the parameter of the logistic regression function that the SLRM is based. After a number of iterations, the training may be terminated based on a predetermined condition. In some implementations, local data management is performed by each SCN 112, 114, and may include storage of data in a database, object store, an in-memory data store (e.g., Redis), or other type of storage.

Figure 2A:
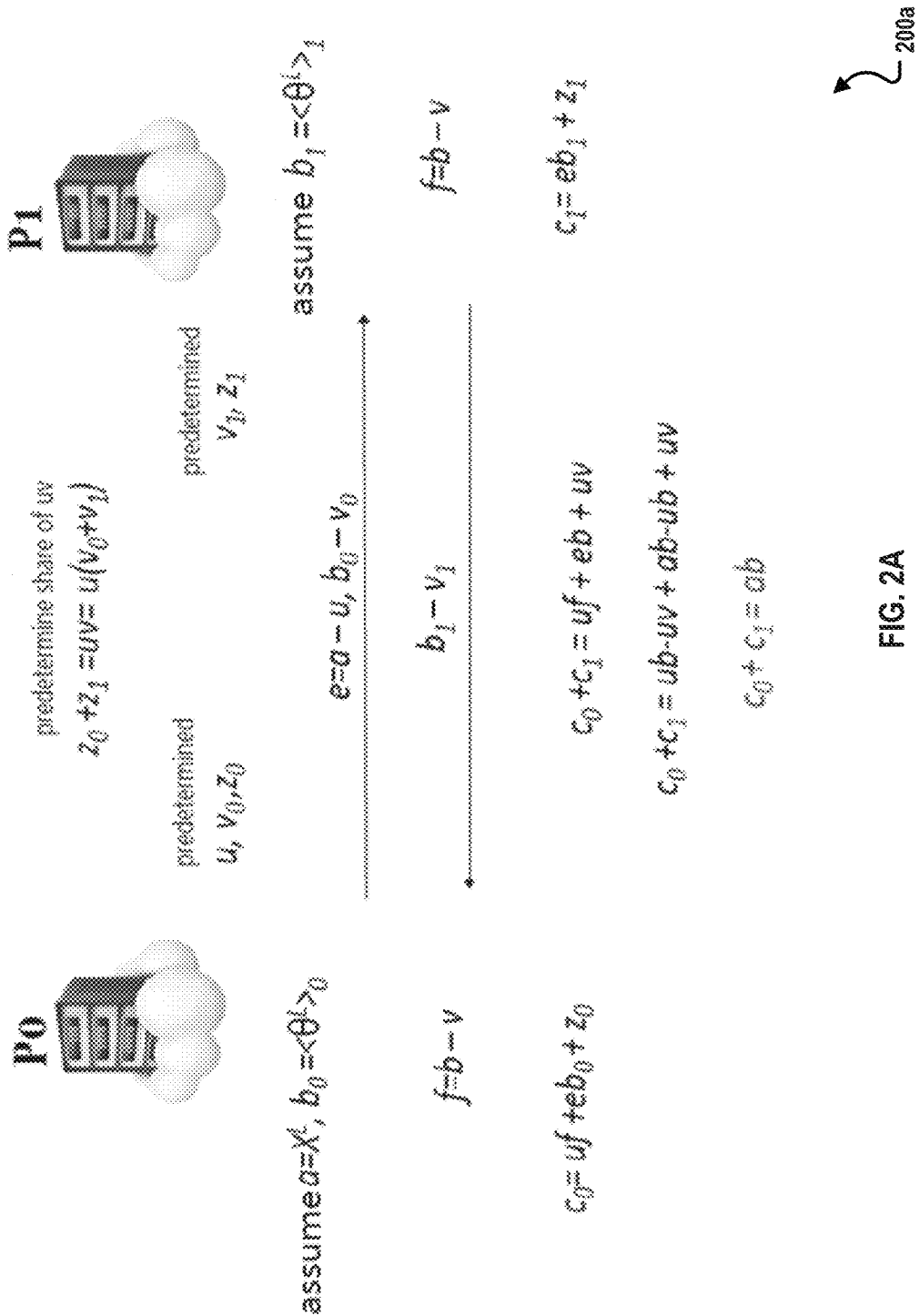
FIG. 2A depicts an example of a sub-process for iteratively updating parameters of an SLRM in accordance with implementations of this specification.

FIG. 2A depicts an example of a sub-process 200a for iteratively updating parameters of an SLRM in accordance with implementations of this specification.

In the depicted example, to optimize an objective function of the SLRM, a mini batch Stochastic Gradient Descent (SGD) method is used. SGD is an iterative method for optimizing a differentiable objective function based on a stochastic approximation of gradient descent optimization. In this disclosure, to optimize the objective function, the SGD method would perform the following iterations:

$$\theta[j] := \theta[j] - \frac{\alpha}{m}\sum_{i=1}^{m}(sigmoid(X_i \cdot \theta) - Y_i)X_i[j] - \frac{\lambda}{m}\theta[j] \quad \text{eq. 1}$$

where m represents the sample size of the mini batch SGD. In this example, X is an m*k sample matrix. Each row of the matrix X represents a sample, and $X_i$ represents the $i^{th}$ row of the matrix X, [j] represents the $j^{th}$ element of vector $X_i$. $\Theta$ represents a parameter column vector. $Y_i$ represents the label of the $i^{th}$ sample of the mini batch samples, where $Y_i$ can be 0 or 1. $\alpha$ and $\lambda$ are hyperparameters that determine a machine learning network structure and how the network is trained. They can be set before training and by a user.

In this depicted example, by using SS, all sample training data sets used in the equation (1) are divided to two shares. That is, the sample training data for the SLRM comes from two sources, SCN $P_0$ and SCN $P_1$. Specifically, the sample data matrix X is divided to $X^L$ and $X^R$, so the sample data $X^L$ belong to SCN $P_0$, while $X^R$ belong to SCN $P_1$. Assume that the samples data in SCN $P_0$ and SCN $P_1$ has features $k_0$ and $k_1$, respectively, and $k=k_0+k_1$. For a sample data set $X_i$, SCN $P_0$ contains elements of $X_i$, expressed as $X_i[1]$, $X_i[2]$, ... $X_i[k_0]$, while SCN $P_1$ contains elements of $X_i$, expressed as $X_i[k_0+1]$, $X_i[k_0+2]$, ... $X_i[k]$. Likewise, the parameter column vector $\Theta$ can also be divided into $\Theta^L$ and $\Theta^R$. As such, using these redefined parameters, under the vertical data division, equation (1) can be expressed as:

$$\theta[j] := \theta[j] - \frac{\alpha}{m}\sum_{i=1}^{m}(sigmoid(X_i^L \cdot \theta^L + X_i^R \cdot \theta^R) - Y_i)X_i[j] - \frac{\lambda}{m}\theta[j] \quad \text{eq. 2}$$

Where X and Y are the input data to be protected. X represents feature data and Y represents a predication made based on the feature data. For example, in a loan-borrowing scenario, X can be the income, education history, credit history, etc. Based on the information, the bank can make a prediction Y, which is whether the risk of the loan borrower is low enough to issue the loan. $\Theta$ is an interim result that needs to be protected, and after the training process terminated, $\Theta$ is also a final output of the training result. Other parameters listed in equation (2) are well-known parameters that routinely used.

The secure logistic regression training algorithm used in the SLRM is based on a mini batch SGD that has a second order regularization, and applies the mathematic circuit (A) and the Garbled Circuit (Yao) of the two-party ABY secured computation framework. The mathematic circuit (A) is based on a multiplication triple and SS, and can be used to calculate addition, subtraction, and multiplication, therefore can compute polynomial, dot product, and matrix multiplications that are used in the algorithm. Meanwhile, the Gabled Circuit (Yao) can be used to perform other types of calculations. In this computational framework, each SCN uses SS for secure calculation. After each computation step, an interim computation result is generated and divided into shares (which may be equal or unequal), while each SCN obtains one share of the interim computation result. After each step, both SCNs enter the next step using the obtained shares, and eventually combine the final generated shares when the iteration terminated.

Before the iteration loop starts, all parameters used to update the model are first initialized. During the initialization process, both SCNs generate a random column vector as a share of the initialized parameter column vector $\Theta$, where $\dim(\theta)=(k_0+k_1+1, 1)$, $\dim(\theta^L)=(k_0+1, 1)$, $\dim(\theta^R)=(k_1, 1)$. The initialized parameter column vector $\Theta$ can be represented by its shares as:

$$\Theta^L = <\Theta^L>_0 + <\Theta^L>_1 \quad \text{eq. 3}$$

$$\Theta^R = <\Theta^R>_0 + <\Theta^R>_1 \quad \text{eq. 4}$$

where < > represents a share, and [i] represents the $i^{th}$ element of a vector (that is, $\Theta[i]=<\Theta[i]>_0+<\Theta[i]>_1$). Thus, the generated random column vector at SCN $P_0$ can be expressed as the following equation:

$$<\Theta>_0 = (<\Theta[1]>_0, <\Theta[2]>_0, <\Theta[3]>_0 \ldots <\Theta[k]>_0) \quad \text{eq. 5}$$

Because each sample data set is vertically divided, $<\Theta^R>_0$ can be further divided by the following two column vectors:

$$<\Theta^L>_0 = (<\Theta^L[1]>_0, <\Theta^L[2]>_0, <\Theta^L[3]>_0 \ldots <\Theta^L[k_0]>_0) \quad \text{eq. 6}$$

$$<\Theta^R>_0 = (<\Theta^R[1]>_0, <\Theta^R[2]>_0, <\Theta^R[3]>_0 \ldots <\Theta^R[k_1]>_0) \quad \text{eq. 7}$$

where $<\Theta^R>_0 = <\Theta^L>_0 \| <\Theta^R>_0$, and where $\|$ represents a connecting relationship.

Likewise the generated random column vector at SCN $P_1$ can be expressed as the following equation:

$$= (<\Theta[1]>_1, <\Theta[2]>_1, <\Theta[3]>_1 \ldots <\Theta[k]>_1) \quad \text{eq. 8}$$

Because each sample data set is vertically divided, $<\Theta>_1$ can be further divided by the following two column vectors:

$$<\Theta^L>_1 = (<\Theta^L[1]>_1, <\Theta^L[2]>_1, <\Theta^L[3]>_1 \ldots <\Theta^L[k_0]>_1) \quad \text{eq. 9}$$

$$<\Theta^R>_1 = (<\Theta^R[1]>_1, <\Theta^R[2]>_1, <\Theta^R[3]>_1 \ldots <\Theta^R[k_1]>_1) \quad \text{eq. 10}$$

where $<\Theta>_1 = <\Theta^L>_1 \| <\Theta^R>_1$, and where $\|$ represents a connecting relationship.

The process of iterations is illustration by FIGS. 2-6. As previously explained, the purpose for the iterations is updating the parameter $\Theta$ shown in equation (2).

FIG. 2A illustrates the first sub-step (herein as "step 1.1") of the first step of the iteration circle (herein as "step 1") during one iteration. In step 1, each SCN first calculates a share of A based on the equation:

$$A = X\Theta = X^L\Theta^L + X^R\Theta^R \quad \text{eq. 11}$$

where A is calculated by using the mini batch sample vector X multiplied by the column vector of the parameter $\Theta$.

In some implementations, $X^L$ and $X^R$ will also be used for updating parameters in step 3 of the iteration circle. In some implementations, the same mini batch sample data can be sued for computation in a later iteration.

FIG. 2A (step 1.1) illustrates the calculation of the value of $X^L \ominus^L$, using the multiplication triple and SS. As shown in FIG. 2A, SCN $P_0$ is the party provides the original data. To hide the original data, SCN $P_0$ and SCN $P_1$ first obtain random numbers. In some implementations, the random number can be a number, a vector, or a matrix. In some implementation, the random numbers can be generated by SCNs. In some implementations, the random number can be requested and received from a third party agency, for example, the random number provider 108 shown in FIG. 1.

As shown in FIG. 2A, the obtained random numbers include a random matrix u, a random vector v, and a random number z. The obtained random numbers are distributed between SCN $P_0$ and SCN $P_1$. In some implementations, SCN $P_0$ obtains a random matrix u, a share of v that expressed as $v_0$, a share of z that expressed as $z_0$. SCN $P_1$ obtains a share of v that expressed as $v_1$, and a share of z that expressed as $z_1$. In some implementations, the shares of z can be generated by a homomorphic calculation. In some implementations, the random vector u is generated by SCN $P_0$, while the random vector v's share $v_0$ and $v_1$ are generated by SCN $P_0$ and SCN $P_1$, respectively. In some implementations, u, v, and z and their corresponding shares are all generated by a trusted third party commodity server. Each of the random numbers, and the share of the corresponding random number are interrelated and the relationship among them can be expressed as:

$$z_0+z_1=u*v=u*(v_0+_1) \quad \text{eq. 12}$$

Assume $a=X^L$, and $b_o=<\ominus^L>_0$. In order to hide the data of SCN $P_0$, encrypts a by using u, for example, by performing an addition, a subtraction or a multiplication of a and u. In some implementation, the random matrix u can be the same when hiding the same $X^L$ in a later iteration. Likewise, $<\ominus_L>_0$ is encrypted by using the random vector $v_0$. As shown in FIG. 2A, SCN $P_0$ sends the encrypted $X^L$ (which is expressed as e=a−u) and the encrypted $<\ominus^L>_0$ (which is expressed as $(b_0-v_0)$) to SCN $P_1$. In some implementations, if the same random matrix u is used to hide the same $X^L$ in a later iteration, the encrypted $X^L$ (e=a−u) does not need to be resent. At the SCN $P_1$ side, assume $b_1=<\ominus^L>_1$. In this case, the random vector share $v_1$ is used to hide the value of $<\ominus^L>_1$, and $(b_1-v_1)$ is sent from SCN $P_1$ to SCN $P_0$.

After the data exchange between SCN $P_0$ and SCN $P_1$, the step 1.1 data queue at SCN $P_0$ is updated as:

$$c_0=u*f+e*b_0+z_0 \quad \text{eq. 13}$$

where f=b−v

And the step 1.1 data queue at SCN $P_1$ is updated as:

$$c_1=e*b_1+z_1 \quad \text{eq. 14}$$

where each of $c_0$ and $c_1$ is a share of $X^L \ominus^L$,

Based on the equations above, $X^L \ominus^L$ can be calculated as:

$$X^L \ominus^L=c_0+c_1 \quad \text{eq. 15}$$

$$c_0+c_1=u*f+e*b+u*v \quad \text{eq. 16}$$

$$c_0+c_1=u*b-u*v+a*b-u*b+u*v \quad \text{eq. 17}$$

Figure 2B:
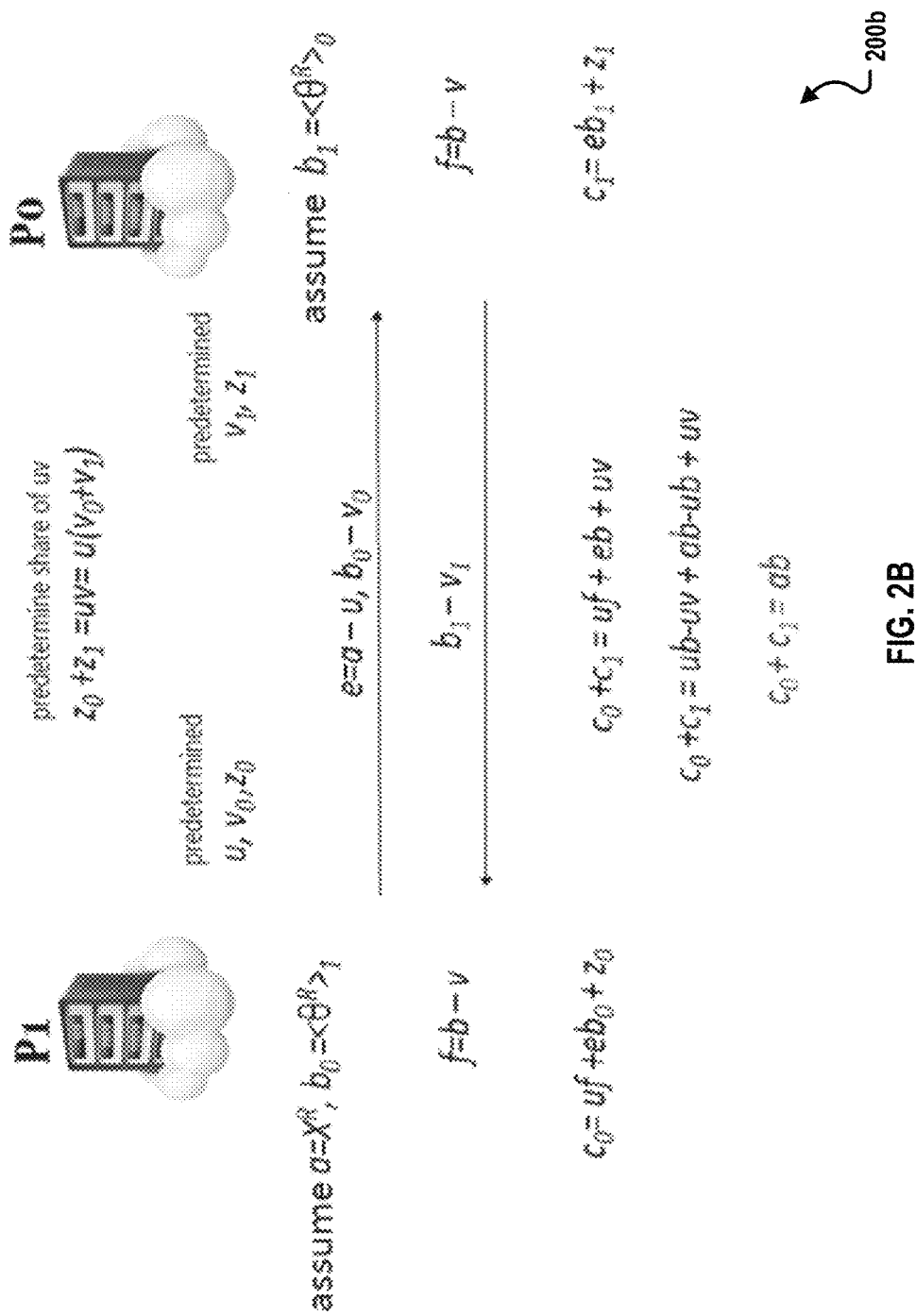
FIG. 2B depicts an example of a sub-process for iteratively updating parameters of an SLRM in accordance with implementations of this specification.

FIG. 2B depicts an example of a sub-process 200b for iteratively updating parameters of an SLRM in accordance with implementations of this specification.

Specifically, FIG. 2B shows a second sub-step (herein as step 1.2) of step 1 of the iteration circle. At step 1.2, the value of $X^R$OR is calculated using the multiplication triple and SS. As shown in FIG. 2B, SCN $P_1$ is the party provides the original data. To hide the original data, SCN $P_1$ and SCN $P_0$ first obtain random numbers.

As shown in FIG. 2B, the obtained random numbers include a random matrix u, a random vector v, and a random number z. The obtained random numbers are distributed between SCN $P_1$ and SCN $P_0$. SCN $P_1$ obtains a random matrix u, a share of v that expressed as $v_0$, a share of z that expressed as $z_0$. SCN $P_0$ obtains a share of v that expressed as $v_1$, and a share of z that expressed as $z_1$. In some implementations, the shares of z can be generated by homomorphic calculation. In some implementations, the random vector u is generated by SCN $P_1$, while the random vector v's share $v_0$ and $v_1$ are generated by SCN $P_1$ and SCN $P_0$, respectively. In some implementations, u, v, and z and their share are all generated by a trusted third party commodity server. Each of the random numbers, and the share of the corresponding random number are interrelated and satisfies a relationship as shown in equation (12).

Assume $a=X^R$, and $b_0=<\ominus^R>_0$, to hide the data information of a, SCN $P_1$ first encrypt a by u, for example, perform an addition, a subtraction or a multiplication between a and u. In some implementation, the random matrix u can be the same when hiding the same $X^R$ in a later iteration. Likewise, $<\ominus^R>_0$ is first encrypted by using the random vector $v_0$. As shown in FIG. 2B, SCN $P_1$ sends the encrypted $X^R$ (which is expressed as e=a−u) and the encrypted $<\ominus^R>_0$ (which is expressed as $(b_0-v_0)$) to SCN $P_0$. In some implementations, if the same random matrix u is used to hide the same $X^L$ in a later iteration, the encrypted $X^L$ (e=a−u) does not need to resend. At the SCN $P_0$ side, assume $b_1=<\ominus^R>_1$. In this case, the random vector share $v_1$ is used to hide the value of $<\ominus^R>_1$, and $(b_1-v_1)$ is sent from SCN $P_0$ to SCN $P_1$.

After the data exchange between SCN $P_1$ and SCN $P_0$, the step 1.2 data queue at SCN $P_1$ is updated by equation (13), and the step 1.2 data queue at SCN $P_0$ is updated by equation (14). Based on the equations above, $X^L \ominus^L$ can be calculated by equations (16) and (17), as well as:

$$X^R \ominus^R=c_0+c_1 \quad \text{eq. 18}$$

As such, step 1 of one iteration circle is completed, and equation (11) can be calculated by combining the results of equations (15) and (18).

Figure 3:
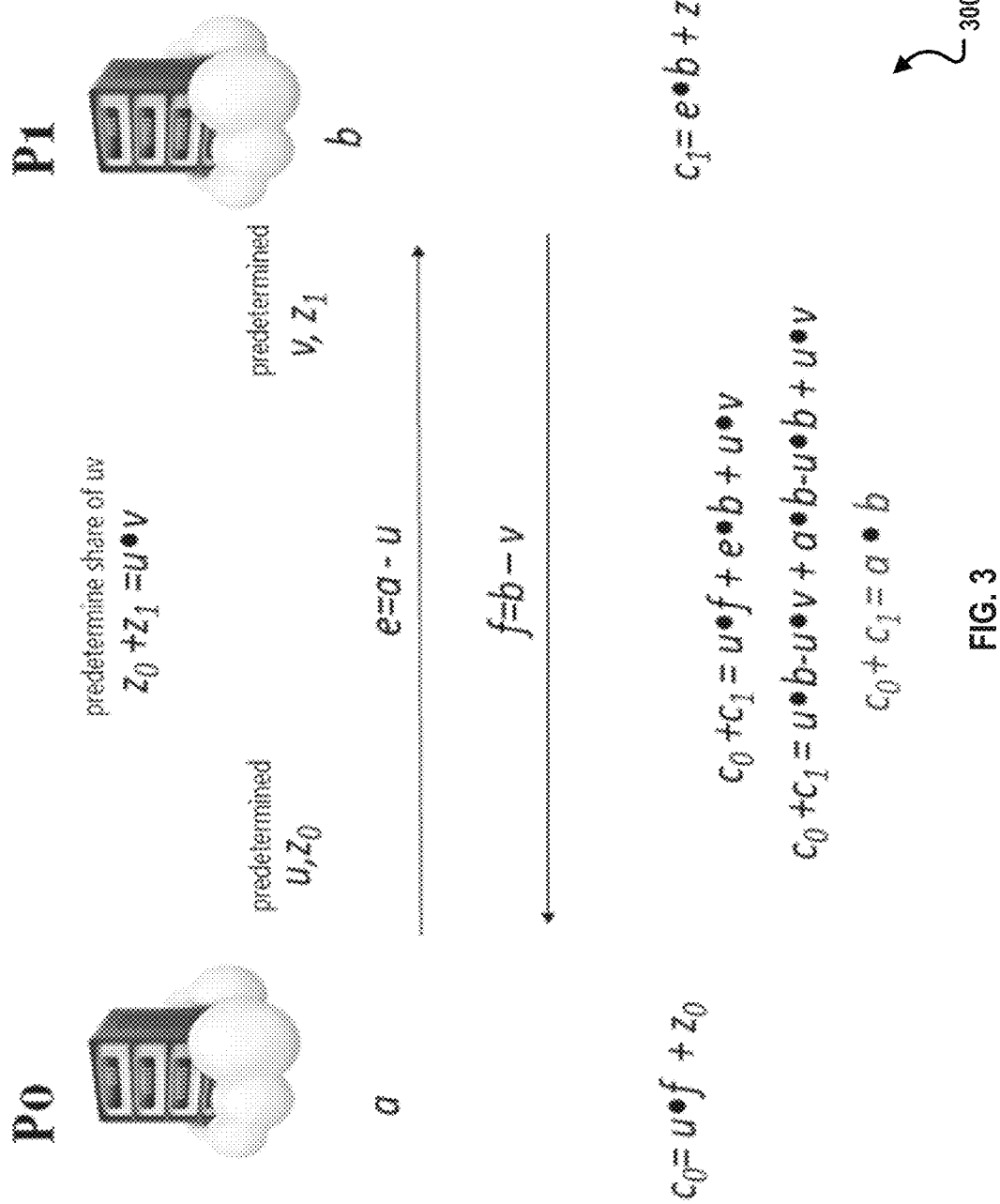
FIG. 3 depicts an example of a sub-process for iteratively updating parameters of an SLRM in accordance with implementations of this specification.

FIG. 3 depicts an example of a sub-process 300 for iteratively updating parameters of an SLRM in accordance with implementations of this specification. Specifically, FIG. 3 illustrates the second step in the iteration cycle (herein referred to as "step 2".)

At step 2, a column vector of the prediction error is calculated by using an equation:

$$E=g(A)-Y_i \quad \text{eq. 19}$$

Where A is the same value as in equation (11) described in step 1. g is a fitting function of a sigmoid function, which can be a polynomial function fitting. That is, g ( ) can be a polynomial function and its highest order is d. In the depicted example in this disclosure, set d=7, and g (x) can be expressed by the equation:

$$g(x)=0.5+1.73496*(x/8)-4.19407*+(x/8)^3 5.43402*(x/8)^5-2.50739*(x/8)^7 \quad \text{eq. 20}$$

where g(A) represents the column vector composed by g (A[1]), g (A[2]), . . . g (A[m]).

Using the multiplication triple and SS, each of SCN $P_0$ and SCN $P_1$ needs to calculate g ($<A[i]_0>+<A[i]_1>$). Assume $p=<A[i]_0>$, and $q=<A[i]_1>$). The polynomial function g (p+q) can be extended as the function:

$$g(p+q)=h_0(q)+h_1(q)p+h_2(q)p^2+ \ldots +h_d(q)p^d \quad \text{eq. 21}$$

Where each of $h_0, h_1, \ldots h_d$ is a polynomial function of q, and can be calculated by SCN $P_1$, while $p, p^2, p^3 \ldots p^d$ can be calculated by SCN $P_0$.

Assume vector $a=(p, p^2, p^3 \ldots p^d)$, and vector $b=(h_1(q), h_2(q), \ldots h_d(q))$, so $g(p+q)=a \cdot b+h_0(q)$, where the dot product $(a \cdot b)$ can be calculated by the process illustrated in FIG. 3, which includes optimized multiplication triple and SS. A final result of E can be calculated by performing addition based on SS.

As shown in FIG. 3, the obtained random numbers include a random matrix u, a random vector v, and a random number z. The obtained random numbers are distributed between SCN $P_0$ and SCN $P_1$. SCN $P_0$ obtains a random matrix u, a share of z that expressed as $z_0$. SCN $P_1$ obtains the random vector v, and a share of z that expressed as $z_1$. Each of the random numbers, and the share of the corresponding random number are interrelated and the relationship among them can be expressed as:

$$z_0+z_1=u*v \qquad \text{eq. 22}$$

Then, as illustrated in FIG. 3, SCN $P_0$ first sends encrypted data $e=a-u$ to SCN $P_1$, and SCN $P_1$ sends encrypted data $f=b-v$ to SCN $P_0$. The steps and calculations are similar to those in step 1, for details please refer to the previous descriptions of FIGS. 2A and 2B.

After the data exchange between SCN $P_0$ and SCN $P_1$, the step 2 data queue at SCN $P_0$ is updated as:

$$c_0=u*f+z_0 \qquad \text{eq. 23}$$

And the step 2 data queue at SCN $P_1$ is updated as:

$$c_1=e*b+z_1 \qquad \text{eq. 24}$$

Based on the equations above, $(a \cdot b)$ can be calculated as:

$$(a \cdot b)=c_0+c_1 \qquad \text{eq. 25}$$

$$c_0+c_1=u*f+e*b+u*v \qquad \text{eq. 26}$$

$$c_0+c_1=u*b-u*v+a*b-u*b+u*v \qquad \text{eq. 27}$$

Figure 4A:
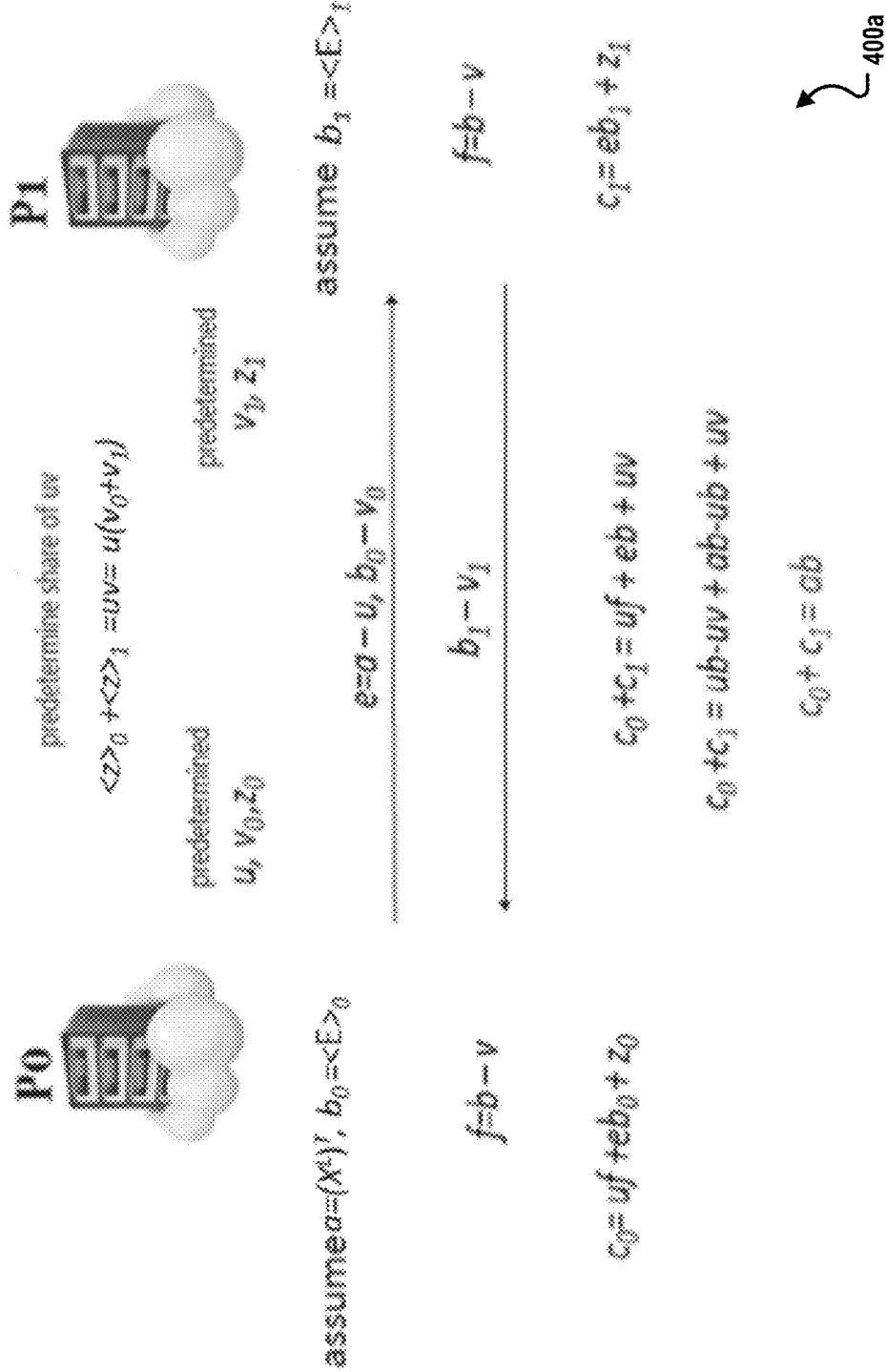
FIG. 4A depicts an example of a sub-process for iteratively updating parameters of an SLRM in accordance with implementations of this specification.
Figure 4B:
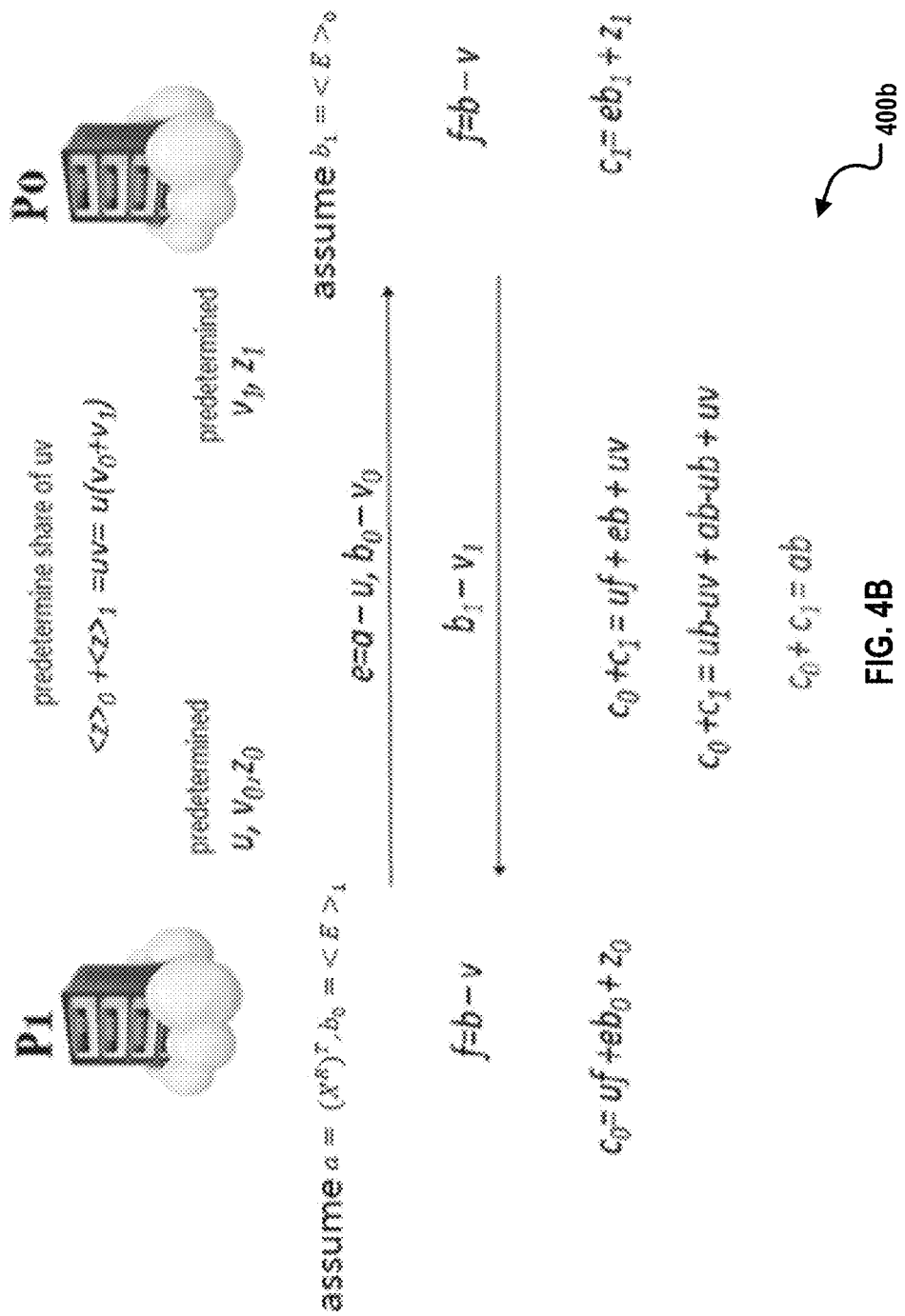
FIG. 4B depicts an example of a sub-process for iteratively updating parameters of an SLRM in accordance with implementations of this specification.

FIG. 4A depicts an example of a sub-process 400a for iteratively updating parameters of an SLRM in accordance with implementations of this specification. FIG. 4B depicts an example of a sub-process 400b for iteratively updating parameters of an SLRM in accordance with implementations of this specification. Specifically, FIGS. 4A and 4B illustrate the process for performing the third step of one iteration circle (herein as "step 3")

At step 3, the column vector $\Theta$, and each of the SCN $P_0$ and SCN $P_1$ can obtain a share of the updated $\Theta$. In this step, the updated $\Theta$ can be expressed as:

$$\theta := \left(1-\frac{\lambda}{m}\right)\theta - \frac{\alpha}{m}X^T E \qquad \text{eq. 28}$$

Where E is the same E in equation (19) of step 2, and where $$X^T E=(X^L)^T E \| (X^R)^T E \qquad \text{eq. 29}$$

The method to calculate $(X^L)^T E$ is the same as the method of calculating $X^L \Theta^L$, while the method to calculate $(X^R)^T E$ is the same as the method of calculating $X^R \Theta^R$, and will not be repeated here. In equation (29), X represents a matrix contains feature data of multiple samples, and E represents an error vector.

After step 3, one iteration circle is completed, and the training process either enters into the next iteration circle and repeats steps 1-3, or the training process is terminated if a condition is satisfied, as described in more details below.

Figure 5:
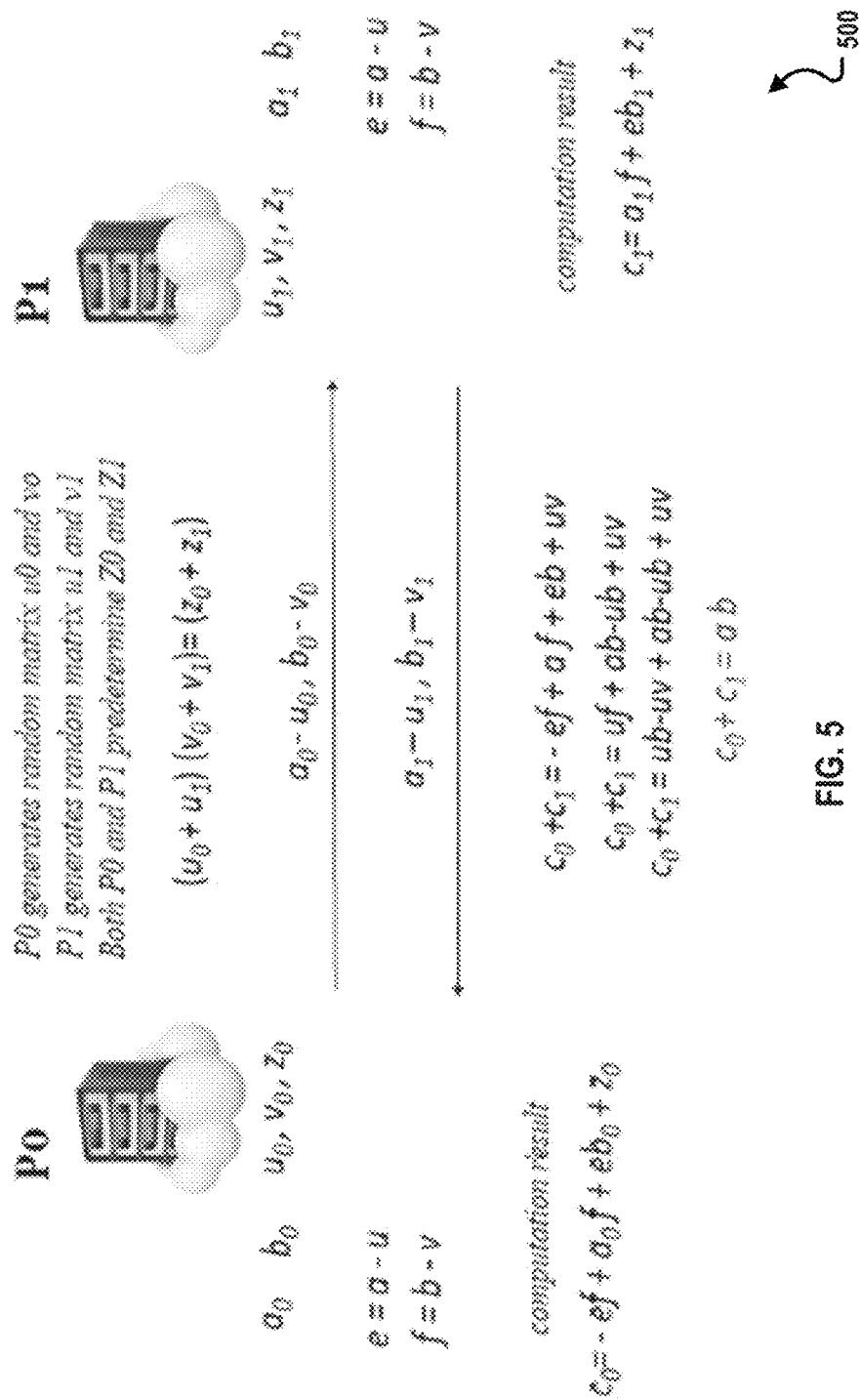
FIG. 5 depicts an example of a process for determining whether to terminate iterations of updating parameters of an SLRM in accordance with implementations of this specification.

FIG. 5 depicts an example of a process 500 for determining whether to terminate iterations of updating parameters of an SLRM in accordance with implementations of this specification.

In some implementations, the iterations can be terminated when the number of completed iteration circles has reached a predetermined number. In some implementations, a threshold is predetermined, and when the difference between two consecutive iteration results is less than that threshold, the iteration is terminated.

Specifically, for example, assume the parameter before and after one iteration circle is $\Theta$ and $\Theta'$, calculate the difference $D=(\Theta'-\Theta)$ using SS. Assume, $a_0=<D^T>_0$, $a_1=<D^T>_1$, $b_0=<D>_0$, and $b_1=<D>_1$. Each of SCN $P_0$ and SCN $P_1$ calculates a share of $D^T D$ using multiplication triple and SS, and the combine each result to obtain D.

As shown in FIG. 5, In some implementations, SCN $P_0$ generates the random matrix $u_0$ and $v_0$, and SCN $P_0$ generates the random matrix $u_1$ and $v_1$. The method of subsequent calculation is similar to the methods previously described in FIGS. 2 and 4, and will not be repeated here. After the data exchanged between SCN $P_0$ and SCN $P_1$, computation result at the SCN $P_0$ is:

$$c_0=-e*f+a_0*f+eb_0+z_0 \qquad \text{eq. 30}$$

where $f=b-v$.

computation result at the SCN $P_1$ is:

$$c_1=a_1*f+eb_1+z_1 \qquad \text{eq. 31}$$

where each of $c_0$ and $c_1$ is a share of $D^T D$

Based on the equations above, $D^T D$ can be calculated as:

$$D^T D=c_0+c_1 \qquad \text{eq. 32}$$

$$c_0+c_1=e*f+a*f+e*b+u*v \qquad \text{eq. 33}$$

$$c_0+c_1=u*f+a*b-u*b+u*v \qquad \text{eq. 34}$$

$$c_0+c_1=u*b-u*v+a*b-u*b+u*v \qquad \text{eq. 35}$$

Figure 6:
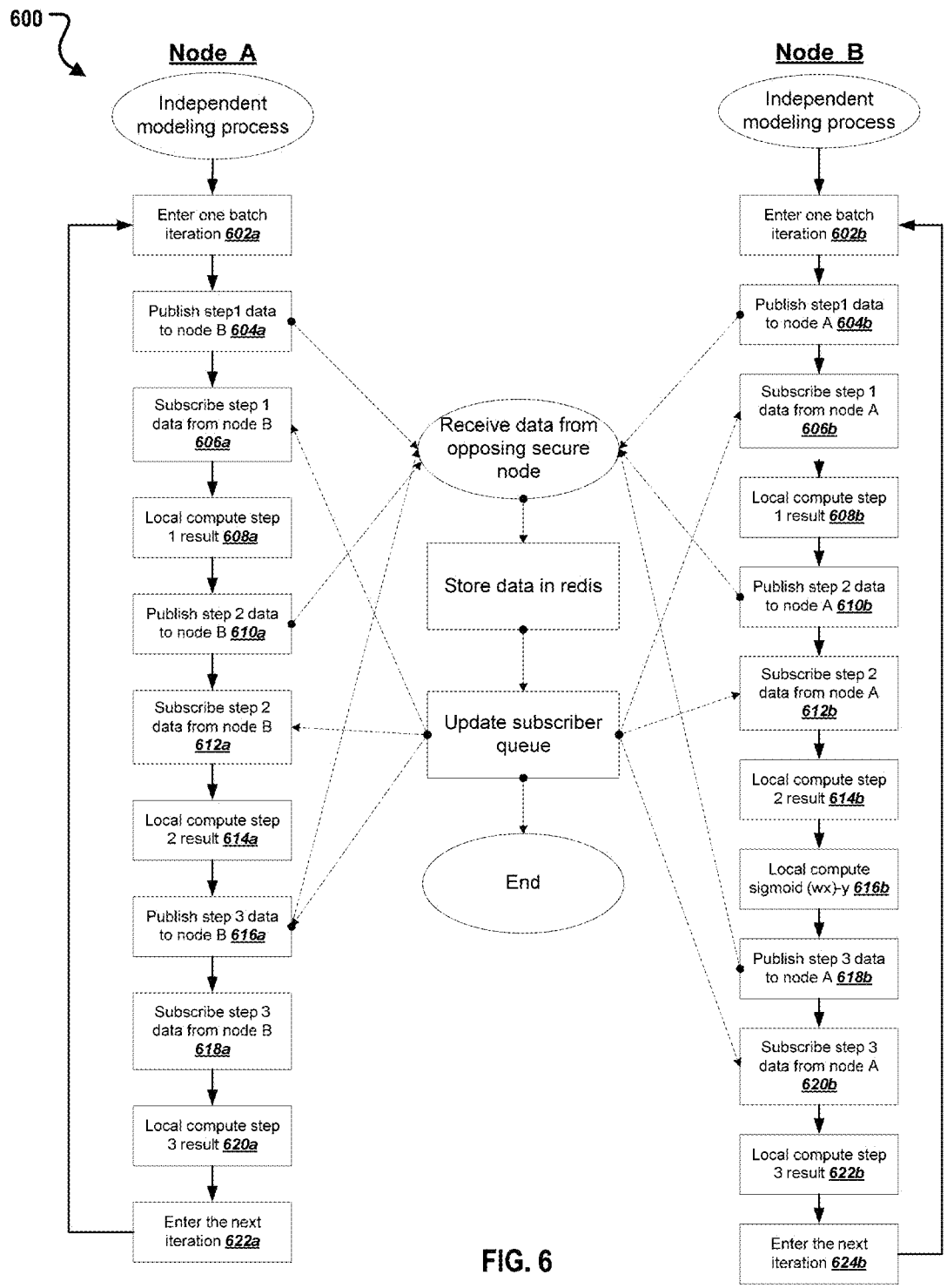
FIG. 6 depicts an example of a process for training a multi-party SLRM using an event-driven interactive secure modeling procedure in accordance with implementations of this specification.

FIG. 6 depicts an example of a process 600 for training a multi-party SLRM using an event-driven interactive secure modeling procedure in accordance with implementations of this specification.

In some implementations, various steps of method 600 can be run in parallel, in combination, in loops, or in any order. For clarity of presentation, the description that follows generally describes method 600 in the context of the other figures in this description. However, it will be understood that method 600 may be performed, for example, by any suitable system, environment, software, and hardware, or a combination of systems, environments, software, and hardware, as appropriate. For example, method 600 can be performed by one or more data processing apparatus that is configured to execute machine learning algorithms using SS. The data processing apparatus can include or be implemented by one or more of, for example, general-purpose CPUs or hardware accelerators such as GPUs, FPGAs, and even custom ASIC processors.

In some implementations, as illustrated in FIG. 6, process 600a (including steps 602a-622a) is performed by the Node A in conjunction with a database, while process 600b (including steps 602b-624b) is performed by the Node B in conjunction with the database. The database can be a Remote Dictionary Server (Redis) and supports the transmission and temporary storage of date for nodes A and B and B. In some implementations, the data can be transmitted between SCNs A and B 112, 114 without going through a database and the subscription queues may be stored and updated locally at each of Node A and Node B. Before the iteration process starts, each of Node A and Node B enters into an independent modeling process and initiate one batch iteration. Each of Node A and Node B can publish and subscribe data, therefore each of Node A and Node B is a publisher (or "producer") and also a subscriber (or "consumer"). Under the event-driven model in this example, even Node A and Node B reply on each other, their modeling process 600 *a* and 600 *b* are independent and are proceed separately.

At 602*a* and 602*b*, Node A and Node B each enter one independent batch iteration. 602*a* and 602 *b* can happen concurrently or consecutively. After 602*a*, process 600*a* proceeds to 604 *a*. After 602*b*, process 600*b* proceeds to 604*b*.

At 604 *a*, Node A publishes step 1 data to Node B. In some implementations, the step 1 data is published by sending encrypted sample data to a database, so the database can store and update the subscriber queue. Once Node A completed this step, a notification might be sent to Node B to inform Node B that publishing step 1 data from Node A has completed. After 604*a*, process 600*a* proceeds to 606*a*.

At 606 *a*, Node A subscribes to step 1 data from node B. In some cases, because the SLRM is trained based on SS, Node A cannot complete the training itself and both data from Nodes A and B are used as input to the model. In some implementations, Node A makes such subscription by requesting step 1 data from Node B from Node B. If the data queue in the database is updated by step 1 data from Node B, Node A will receive a notification. Because at this time Node A has not received the notification from Node B, the next step of 600*a* cannot be triggered and process 600*a* is temporarily suspended.

Meanwhile, at 604*b*, Node B publishes step 1 data to Node A. In some implementations, the step 1 data is published by sending encrypted sample data to a database, so the database can store and update the subscriber queue. Once Node B complete this step, a notification might be sent to Node A to inform Node A that step 1 data publishing from Node B has completed. After 604*b*, process 600*b* proceeds to 606*b*.

At 606 *b*, Node B subscribes to step 1 data from node B. Because at this time Node A already published step 1 data and Node B has already received notification from Node A, the next step is triggered and after 606*b*, process 600 *b* proceeds to 608*b*.

At 608*b*, Node B locally computes a step 1 result by using its own data and step 1 data received from Node A. Equations and detailed steps of this step can be referred to the previously described FIG. 2B. After 608*b*, process 600*b* proceeds to 610*b*.

Because both steps 610*b* and 612 *b* can be independently performed by Node B, Node B can perform these two step together or consecutively without relying on Node A's action. After steps 610*b* and 612*b*, the subscriber queue in database is updated by using the step 2 data published by Node B, and a notification of publishing is sent to Node A. After step 612*b*, because Node B has not received notification from Node A, the next step cannot be triggered and process 600 *b* is temporarily suspended.

Returning to step 606*a* of process 600*a*. If at the time Node B already carried out step 604 *b*, and Node A has already received notifications from Node B, the next step of process 600*a* is triggered and after 606*a*, process 600*a* proceeds to 608*a*.

Because steps 608*a*-612*a* can be independently performed by Node A without data from Node B, Node A can perform these steps consecutively. After step 610*a*, the subscriber queue in database is updated by using the step 2 data published by Node A, and a notification of publishing is sent to Node B. After step 612*a*, if Node B already performed step 610*b* and Node A received corresponding notification, the next step of 600 *a* is triggered and the process 600 *a* proceeds to 614*a*. Otherwise, process 600*a* is temporarily suspended until step 610 *b* is performed.

Because steps 614*a*-618*a* can be independently performed by Node A, Node A can perform these steps consecutively. After steps 614*a* and 616*a*, the subscriber queue in database is updated by using the step 3 data published by Node A, and a notification of publishing is sent to Node B. After step 618*a*, because Node A has not received notification from Node B, process 600*a* may be temporarily suspended until the notification from Node B is received.

Returning to process 600*b*. After step 610 *a* where Node A published its step 2 data and sent the corresponding notification, the next step of process 600*b* is triggered and process 600*b* can proceed to 614*b*. At 614*b*, Node B locally compute step 2 result by using its own data and step 2 data received from Node A. Equations and detailed steps of the computation step can be referred to the previously described FIG. 3. After 614*b*, process 600*b* proceeds to 616*b*.

Because each step of 616*b*-620*b* can be independently performed by Node B, Node B can perform these three steps consecutively. At 616*b*, a value of sigmoid (wx)−y is computed by using equation (20). After steps 618*b* and 620*b*, the subscriber queue in database is updated by using the step 3 data published by Node B, and a notification of publishing is sent to Node A. After step 620*b*, if at the time Node A already performed 616*a* and *e* Node B has received notification from Node A, the next step of 600*b* is triggered and process 600*b* proceeds to 622*b*.

At 622*b*, Node B locally computes step 3 results using its own data and step 3 data received from Node A. Equations and detailed steps of the computation detailed in the previously-described FIG. 4B. After 622*b*, because whether to enter the next iteration is jointly determined by Node A and Node B, after 622*b*, and because Node B has not received notification from Node B, process 600*b* is temporarily suspended.

Returning to process 600*a*, after step 618*b* where Node B has published its step 3 data and sent the corresponding notification, the next step of process 600*a* is triggered and process 600*a* can proceed to 620*a*. At 620*a*, Node A locally computes step 3 result by using its own data and step 3 data received from Node A. Equations and detailed steps of the computation step can be referred to the previously described FIG. 3. After 620*a*, both Node A and Node B have completed an iteration circle.

As previously described in FIG. 4, whether to terminate the iteration circle depends on whether a predetermined condition is satisfied. If so, both processes 600*a* and 600*b* proceed to 622*a* and 624*a*, and repeat the steps from 602*a*-620*a*, and 602*b*-622*b* again. If not, the iteration is terminated and both processes 600*a* and 600*b* stop at 618*a* and 622*b*, respectively.

Figure 7:
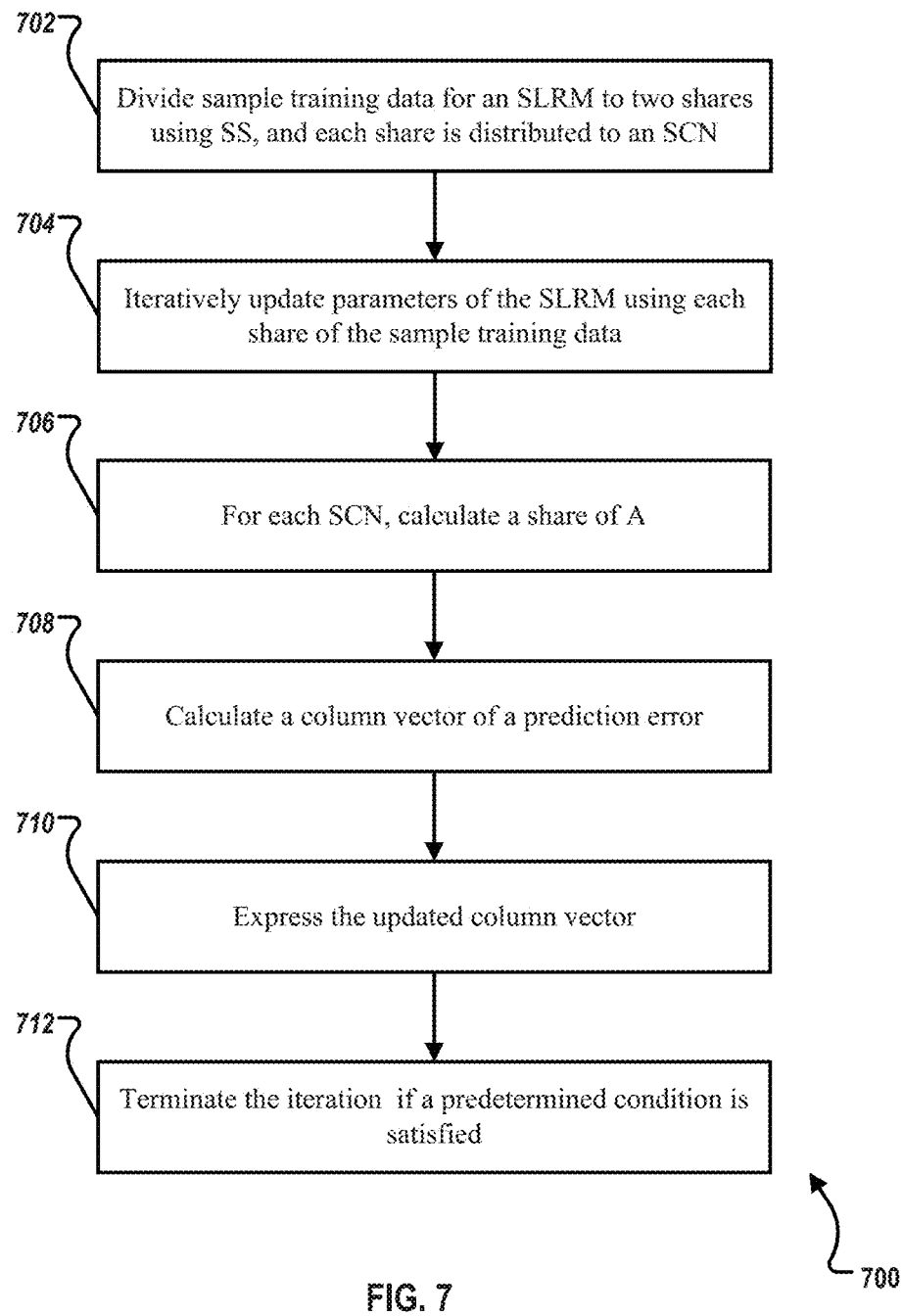
FIG. 7 depicts an example of a process that can be executed in accordance with implementations of the present specification.

FIG. 7 depicts an example of a process 700 that can be executed in accordance with implementations of the present specification. In some implementations, various steps of method 700 can be run in parallel, in combination, in loops, or in any order. For clarity of presentation, the description that follows generally describes method 700 in the context of the other figures in this description. However, it will be understood that method 700 may be performed, for example, by any suitable system, environment, software, and hardware, or a combination of systems, environments, software, and hardware, as appropriate. For example, the method 700 can be performed by one or more data processing apparatus that is configured to execute machine learning algorithms using SS. The data processing apparatus can include or be implemented by one or more of, for example, general-purpose CPUs or hardware accelerators such as GPUs, FPGAs, and even custom ASIC processors.

At 702, sample training data for an SLRM is divided to two shares using SS, and each share is distributed to an SCN. In some implementations, a sample data matrix X is divided to $X^L$ and $X^R$, and the sample data matrix $X^L$ belongs to an SCN 1, and the sample data matrix $X^R$ belongs to SCN 2. After 702, process 700 proceeds to 704.

At 704, parameters of the SLRM are iteratively updated using each share of the sample training data. In some implementations, an objective function of the SLRM is optimized by using a mini batch Stochastic Gradient Descent (SGD) method.

In some implementations, the SLRM is based on a logistic regression function that can be expressed as:

$$\theta[j] := \theta[j] - \frac{\alpha}{m}\sum_{i=1}^{m}(sigmoid(X_i^L \cdot \theta^L + X_i^R \cdot \theta^R) - Y_i)X_i[j] - \frac{\lambda}{m}\theta[j]$$

where m represents the sample size of the mini batch SGD. X represents an m*k sample matrix. Each row of the matrix X represents a sample, and $X_i$ represents the $i^{th}$ row of the matrix X, [j] represents the $j^{th}$ element of vector $X_i$. The sample data matrix X is divided to $X^L$ and $X^R$, and the sample data $X^L$ belong to SCN $P_0$, while $X^R$ belong to SCN $P_1$. e represents a parameter column vector, and the column vector $\ominus$ can be vertically divided to $\ominus^L$ and $\ominus^R$.

In some implementations, training the SLRM includes using an event-driven model. After 704, process 700 proceeds to 706.

At 706, for each SCN, a share of A is calculated based on:

$$A = X\ominus = X^L\ominus^L + X^R\ominus^R$$

In some implementations, calculating $X^L\ominus^L$ and $X^R\ominus^R$ includes, hiding original data provided from each SCN by using random numbers, and exchanging hided data between SCNs. In some implementations, prior to hiding the original data, random numbers are obtained by each SCN. In some implementations, the random number can be a number, a vector, or a matrix. In some implementation, the random numbers can be generated by the SCN. In some implementations, the random number can be requested and received from a third party agency. After 706, process 700 proceeds to 708.

At 708, a column vector of a prediction error is calculated based on:

$$E = g(A) - Y_i$$

where g is a fitting function of a sigmoid function, which can be a polynomial function fitting. In some implementations, if the order or g(x) is 7, g (x) can be expressed by the equation: $g(x) = 0.5 + 1.73496*(x/8) - 4.19407*+(x/8)^3 5.43402*(x/8)^5 - 2.50739*(x/8)^7$ where g(A) represents the column vector composed by g (A[1]), g (A[2]), . . . g (A[m]). After 708, process 700 proceeds to 710.

At 710, the updated column vector $\ominus$ can be expressed as:

$$\theta := \left(1 - \frac{\lambda}{m}\right)\theta - \frac{\alpha}{m}X^T E$$

where $X^T E = (X^L)^T E \| (X^R)^T E$

After 710, process 700 proceeds to 712.

At 712, the iteration is terminated if a predetermined condition is satisfied. In some implementations, the iterations can be terminated when the number of completed iteration cycles has reached a predetermined number.

In some implementations, a threshold is predetermined, and when the difference between two consecutive iteration results is less than that threshold, the iteration is terminated. After 712, process 700 can stop.

Figure 8:
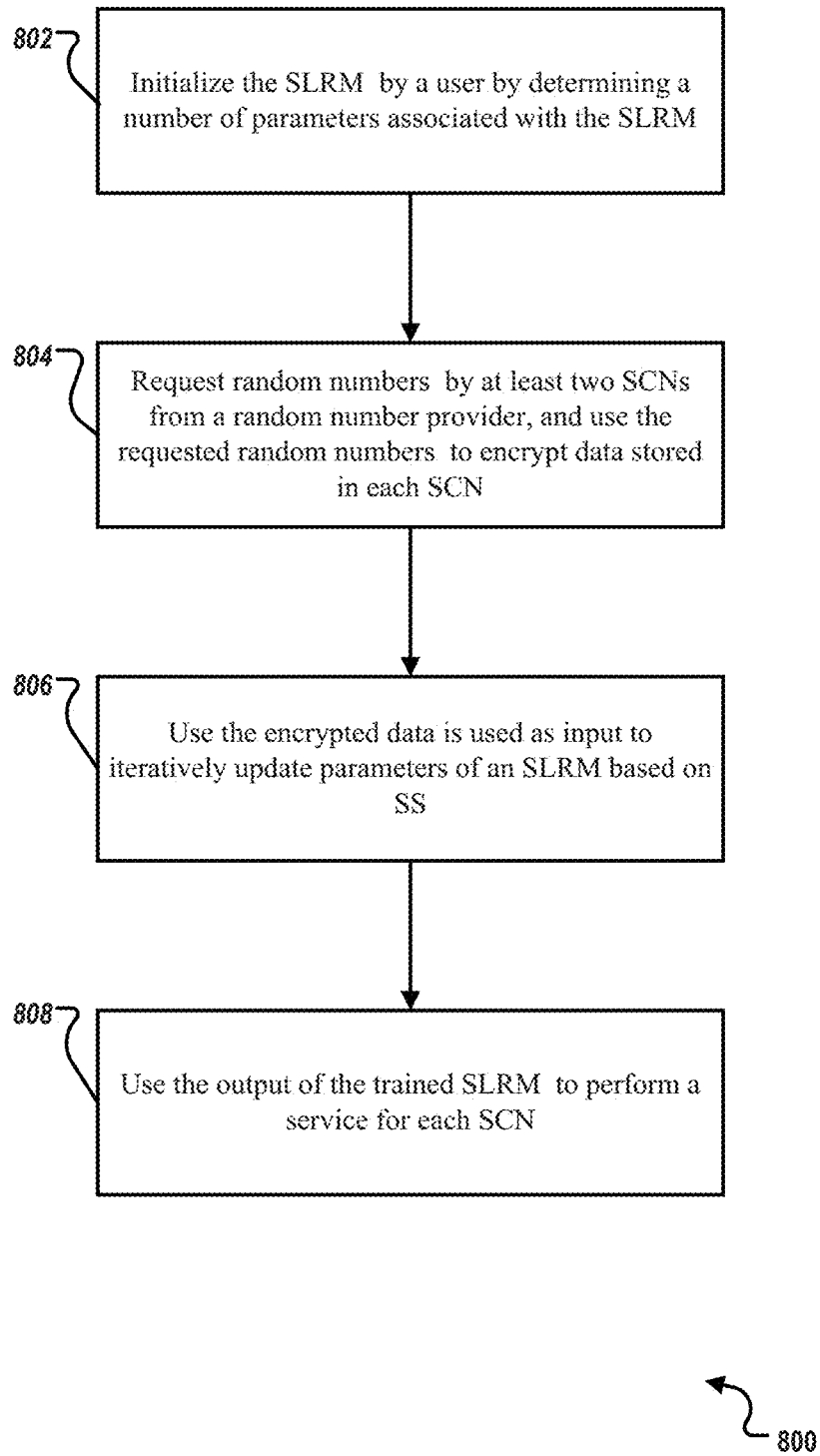
FIG. 8 depicts an example of a process that can be executed in accordance with implementations of the present specification.

FIG. 8 depicts an example of a process 800 that can be executed in accordance with implementations of the present specification. In some implementations, various steps of method 800 can be run in parallel, in combination, in loops, or in any order. For clarity of presentation, the description that follows generally describes method 800 in the context of the other figures in this description. However, it will be understood that method 800 may be performed, for example, by any suitable system, environment, software, and hardware, or a combination of systems, environments, software, and hardware, as appropriate. For example, method 800 can be performed by one or more data processing apparatus that is configured to execute machine learning algorithms using SS. The data processing apparatus can include or be implemented by one or more of, for example, general-purpose CPUs or hardware accelerators such as GPUs, FPGAs, and even custom ASIC processors.

At 802, the SLRM is initialized by a user by determining a number of parameters associated with the SLRM. In some implementations, the parameters can include the size of training data, features associated with the training data, corresponding to settings of the SLRM, hyperparameters of the SLRM.

In some implementations, after the user has initialized the SLRM, information associated with the SLRM is sent to a security management agent. In some implementations, the security management agent processes the SLRM and training data fed to the model. In some implementations, a node management agent is configured to select and manage SCNs that participate in the training. In some implementations, both of the security management agent and the node management agent can be configured as a third party agent. After 802, process 800 proceeds to 804.

At 804, random numbers are requested by at least two SCNs from a random number provider, and the requested random numbers are used to encrypt data stored in each SCN. In some implementations, the random number can be a number, a vector, or a matrix, etc. In some implementations, the random numbers can be generated by at least one SCN. In some implementations, the random numbers can be provided by an independent third party.

In some implementations, encrypting the data includes performing computations using the data and the received random numbers. In some implementations, the computations performed is at least one of addition, subtraction, and multiplication. After 802, process 800 proceeds to 804.

At 806, the encrypted data is used as input to iteratively update parameters of an SLRM based on SS. Details of this step will be further described in FIG. 7. After 806, process 800 proceeds to 808.

At 808, the output of the trained SLRM is used to perform a service for each SCN. In some implementations, the service can be a prediction service or a classification service. After 808, process 800 stops.

Figure 9:
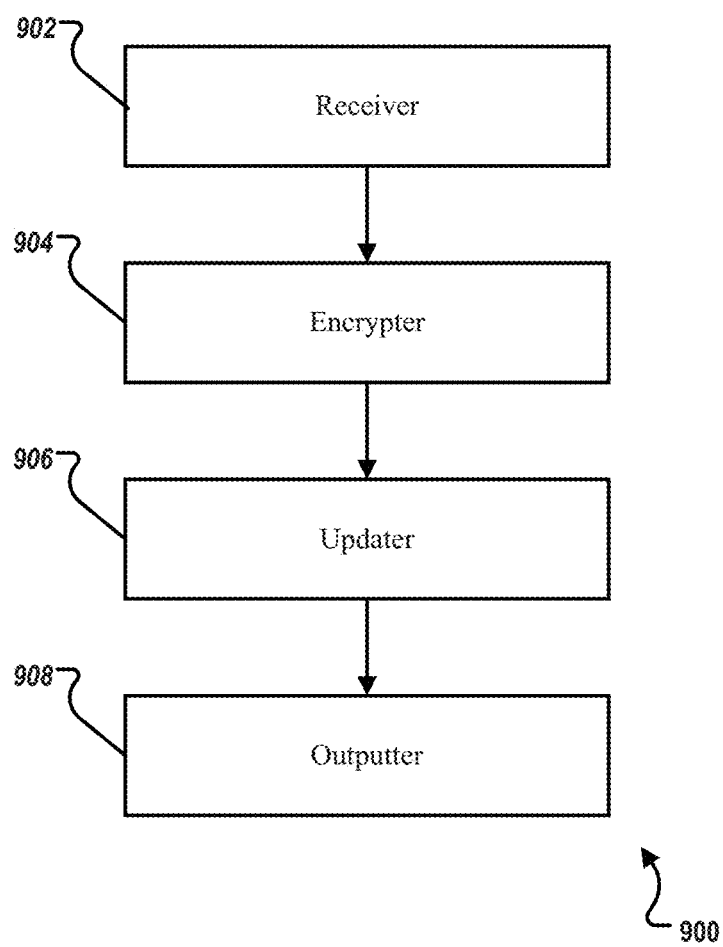
FIG. 9 depicts an example of a diagram illustrating modules of an apparatus in accordance with implementations of the specification Like reference numbers and designations in the various drawings indicate like elements.

FIG. 9 depicts an example of a diagram 900 illustrating modules of an apparatus in accordance with implementations of the specification. The apparatus 900 can be an example implementation of an apparatus for training multi-party secure logistic regression models. The apparatus 900 can correspond to the implementations described above, and the apparatus 900 includes the following: a receiver or receiving unit 902 for receiving, at a plurality of secure computation nodes (SCNs), a plurality of random numbers from a random number provider; an encrypter or encrypting unit 904 for encrypting, at each SCN, data stored at the SCN using the received random numbers; and updater or updating unit 906 for iteratively updating a secure logistic regression model (SLRM) by using the encrypted data from each SCN; and an outputter or output unit 908 for outputting a result of the SLRM, wherein the result is configured to enable a service to be performed by each SCN after iteratively updating the SLRM.

In an optional implementation, each random number is at least one of a number, a vector, or a matrix.

In an optional implementation, at least one of the random numbers is generated by a third-party agent.

In an optional implementation, the updater or updating unit 906 is used to iteratively updating the SLRM based on a Secret Sharing (SS) scheme.

In an optional implementation, the updater or updating unit 906 is used to iteratively updating the SLRM based on an event-driven model.

In an optional implementation, the updater or updating unit 906 is used to iteratively updating the SLRM by determining a column vector of a prediction error based on equation (19).

In an optional implementation, the apparatus 900 further includes a initializer or initializing unit for initializing parameters associated with the SLRM prior to receiving a plurality of random numbers from the random number provider.

In an optional implementation, iteratively updating the SLRM continues until a difference between two consecutive iteration results is less than a predetermined threshold.

The system, apparatus, module, or unit illustrated in the previous implementations can be implemented by using a computer chip or an entity, or can be implemented by using a product having a certain function. A typical implementation device is a computer, and the computer can be a personal computer, a laptop computer, a cellular phone, a camera phone, a smartphone, a personal digital assistant, a media player, a navigation device, an email receiving and sending device, a game console, a tablet computer, a wearable device, or any combination of these devices.

For an implementation process of functions and roles of each unit in the apparatus, references can be made to an implementation process of corresponding steps in the previous method. Details are omitted here for simplicity.

Because an apparatus implementation basically corresponds to a method implementation, for related parts, references can be made to related descriptions in the method implementation. The previously described apparatus implementation is merely an example. The units described as separate parts may or may not be physically separate, and parts displayed as units may or may not be physical units, may be located in one position, or may be distributed on a number of network units. Some or all of the modules can be selected based on actual demands to achieve the objectives of the solutions of the specification. A person of ordinary skill in the art can understand and implement the implementations of the present application without creative efforts.

Referring again to FIG. 9, it can be interpreted as illustrating an internal functional module and a structure of an apparatus for processing data using a distributed multi-party security model training framework for privacy protection. The execution apparatus can be an example of an apparatus configured to enable data processing.

Implementations of the subject matter and the actions and operations described in this specification can be implemented in digital electronic circuitry, in tangibly-embodied computer software or firmware, in computer hardware, including the structures disclosed in this specification and their structural equivalents, or in combinations of one or more of them. Implementations of the subject matter described in this specification can be implemented as one or more computer programs, e.g., one or more modules of computer program instructions, encoded on a computer program carrier, for execution by, or to control the operation of, data processing apparatus. The carrier may be a tangible non-transitory computer storage medium. Alternatively, or in addition, the carrier may be an artificially-generated propagated signal, e.g., a machine-generated electrical, optical, or electromagnetic signal, that is generated to encode information for transmission to suitable receiver apparatus for execution by a data processing apparatus. The computer storage medium can be or be part of a machine-readable storage device, a machine-readable storage substrate, a random or serial access memory device, or a combination of one or more of them. A computer storage medium is not a propagated signal.

The term "data processing apparatus" encompasses all kinds of apparatus, devices, and machines for processing data, including by way of example a programmable processor, a computer, or multiple processors or computers. Data processing apparatus can include special-purpose logic circuitry, e.g., an FPGA (field programmable gate array), an ASIC (application-specific integrated circuit), or a GPU (graphics processing unit). The apparatus can also include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, an engine, a script, or code, can be written in any form of programming language, including compiled or interpreted languages, or declarative or procedural languages; and it can be deployed in any form, including as a stand-alone program or as a module, component, engine, subroutine, or other unit suitable for executing in a computing environment, which environment may include one or more computers interconnected by a data communication network in one or more locations.

A computer program may, but need not, correspond to a file in a file system. A computer program can be stored in a portion of a file that holds other programs or data, e.g., one or more scripts stored in a markup language document, in a single file dedicated to the program in question, or in multiple coordinated files, e.g., files that store one or more modules, sub-programs, or portions of code.

The processes and logic flows described in this specification can be performed by one or more computers executing one or more computer programs to perform operations by operating on input data and generating output. The processes and logic flows can also be performed by special-purpose logic circuitry, e.g., an FPGA, an ASIC, or a GPU, or by a combination of special-purpose logic circuitry and one or more programmed computers.

Computers suitable for the execution of a computer program can be based on general or special-purpose microprocessors or both, or any other kind of central processing unit. Generally, a central processing unit will receive instructions and data from a read-only memory or a random access memory or both. Elements of a computer can include a central processing unit for executing instructions and one or more memory devices for storing instructions and data. The central processing unit and the memory can be supplemented by, or incorporated in, special-purpose logic circuitry.

Generally, a computer will also include, or be operatively coupled to receive data from or transfer data to one or more mass storage devices. The mass storage devices can be, for example, magnetic, magneto-optical, or optical disks, or solid state drives. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

To provide for interaction with a user, implementations of the subject matter described in this specification can be implemented on, or configured to communicate with, a computer having a display device, e.g., a LCD (liquid crystal display) monitor, for displaying information to the user, and an input device by which the user can provide input to the computer, e.g., a keyboard and a pointing device, e.g., a mouse, a trackball or touchpad. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser, or by interacting with an app running on a user device, e.g., a smartphone or electronic tablet. Also, a computer can interact with a user by sending text messages or other forms of message to a personal device, e.g., a smartphone that is running a messaging application, and receiving responsive messages from the user in return.

While this specification contains many specific implementation details, these should not be construed as limitations on the scope of what is being claimed, which is defined by the claims themselves, but rather as descriptions of features that may be specific to particular implementations. Certain features that are described in this specification in the context of separate implementations can also be realized in combination in a single implementation. Conversely, various features that are described in the context of a single implementations can also be realized in multiple implementations separately or in any suitable subcombination. Moreover, although features may be described above as acting in certain combinations and even initially be claimed as such, one or more features from a claimed combination can in some cases be excised from the combination, and the claim may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the implementations described above should not be understood as requiring such separation in all implementations, and it should be understood that the described program components and systems can generally be integrated together in a single software product or packaged into multiple software products.

Particular implementations of the subject matter have been described. Other implementations are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A computer-implemented method for training multi-party secure logistic regression models, the computer-implemented method comprising:
   receiving, by a first secure computation node (SCN) of a plurality of secure computation nodes (SCNs), a first random number of a plurality of random numbers from a random number provider;
   encrypting, by the first SCN, data stored at the SCN using the first random number to generate a first encrypted data;
   transmitting, by the first SCN, the first encrypted data to a second SCN of the plurality of SCNs;
   receiving, by the first SCN and from the second SCN, a second encrypted data that was encrypted using a second random number of the plurality of random numbers from the random number provider;
   iteratively updating, by the first SCN, a secure logistic regression model (SLRM) by using the first encrypted data and the second encrypted data to generate an interim computation result that is divided into a plurality of shares that are transmitted to the plurality of SCNs to be used as subsequent inputs for the SLRM to determine a column vector of a prediction error as a difference between a sigmoid fitting function applied to a respective share and a label of a sample of a mini batch of a Stochastic Gradient Descent method, each of the plurality of shares hiding original data such that the original data cannot be recovered by using a single share of the plurality of shares; and
   after iteratively updating the SLRM, outputting a result of the SLRM, wherein the result is configured to enable a service to be performed by each SCN of the plurality of SCNs.

2. The computer-implemented method of claim 1, wherein each random number is at least one of a number, a vector, or a matrix.

3. The computer-implemented method of claim 1, wherein at least one of the random numbers is generated by a third-party agent.

4. The computer-implemented method of claim 1, wherein iteratively updating the SLRM is based on a Secret Sharing (SS) scheme.

5. The computer-implemented method of claim 1, wherein iteratively updating the SLRM comprises:
receiving a notification that a portion of a service process is completed; and
in response to receiving the notification, initiating a second portion of the service process.

6. The computer-implemented method of claim 1, further comprising:
prior to receiving a plurality of random numbers from the random number provider, initializing parameters associated with the SLRM.

7. The computer-implemented method of claim 1, wherein iteratively updating the SLRM continues until a difference between two consecutive iteration results is less than a predetermined threshold.

8. A non-transitory, computer-readable medium storing one or more instructions executable by a computer system to perform operations comprising:
receiving, by a first secure computation node (SCN) of a plurality of secure computation nodes (SCNs), a first random number of a plurality of random numbers from a random number provider;
encrypting, by the first SCN, data stored at the SCN using the first random number to generate a first encrypted data;
transmitting, by the first SCN, the first encrypted data to a second SCN of the plurality of SCNs;
receiving, by the first SCN and from the second SCN, a second encrypted data that was encrypted using a second random number of the plurality of random numbers from the random number provider;
iteratively updating, by the first SCN, a secure logistic regression model (SLRM) by using the first encrypted data and the second encrypted data to generate an interim computation result that is divided into a plurality of shares that are transmitted to the plurality of SCNs to be used as subsequent inputs for the SLRM to determine a column vector of a prediction error as a difference between a sigmoid fitting function applied to a respective share and a label of a sample of a mini batch of a Stochastic Gradient Descent method, each of the plurality of shares hiding original data such that the original data cannot be recovered by using a single share of the plurality of shares; and
after iteratively updating the SLRM, outputting a result of the SLRM, wherein the result is configured to enable a service to be performed by each SCN of the plurality of SCNs.

9. The non-transitory, computer-readable medium of claim 8, wherein each random number is at least one of a number, a vector, or a matrix.

10. The non-transitory, computer-readable medium of claim 8, wherein at least one of the random numbers is generated by a third-party agent.

11. The non-transitory, computer-readable medium of claim 8, wherein iteratively updating the SLRM is based on a Secret Sharing (SS) scheme.

12. The non-transitory, computer-readable medium of claim 8, wherein iteratively updating the SLRM comprises:
receiving a notification that a portion of a service process is completed; and
in response to receiving the notification, initiating a second portion of the service process.

13. The non-transitory, computer-readable medium of claim 8, the operations comprising:
prior to receiving the plurality of random numbers from the random number provider, initializing parameters associated with the SLRM.

14. The non-transitory, computer-readable medium of claim 8, wherein iteratively updating the SLRM continues until a difference between two consecutive iteration results is less than a predetermined threshold.

15. A computer-implemented system, comprising:
one or more computers; and
one or more computer memory devices interoperably coupled with the one or more computers and having tangible, non-transitory, machine-readable media storing one or more instructions that, when executed by the one or more computers, perform one or more operations comprising:
receiving, receiving, by a first secure computation node (SCN) of a plurality of secure computation nodes (SCNs), a first random number of a plurality of random numbers from a random number provider;
encrypting, by the first SCN, data stored at the SCN using the first random number to generate a first encrypted data;
transmitting, by the first SCN, the first encrypted data to a second SCN of the plurality of SCNs;
receiving, by the first SCN and from the second SCN, a second encrypted data that was encrypted using a second random number of the plurality of random numbers from the random number provider;
iteratively updating, by the first SCN, a secure logistic regression model (SLRM) by using the first encrypted data and the second encrypted data to generate an interim computation result that is divided into a plurality of shares that are transmitted to the plurality of SCNs to be used as subsequent inputs for the SLRM to determine a column vector of a prediction error as a difference between a sigmoid fitting function applied to a respective share and a label of a sample of a mini batch of a Stochastic Gradient Descent method, each of the plurality of shares hiding original data such that the original data cannot be recovered by using a single share of the plurality of shares; and
after iteratively updating the SLRM, outputting a result of the SLRM, wherein the result is configured to enable a service to be performed by each SCN of the plurality of SCNs.

16. The computer-implemented system of claim 15, wherein each random number is at least one of a number, a vector, or a matrix.

17. The computer-implemented system of claim 15, wherein at least one of the random numbers is generated by a third-party agent.

18. The computer-implemented system of claim 15, wherein iteratively updating the SLRM is based on a Secret Sharing (SS) scheme.

* * * * *

UNITED STATES PATENT AND TRADEMARK OFFICE
CERTIFICATE OF CORRECTION

PATENT NO. : 10,630,468 B1
APPLICATION NO. : 16/448739
DATED : April 21, 2020
INVENTOR(S) : Huazhong Wang, Shan Yin and Pengfei Ying Page 1 of 1

It is certified that error appears in the above-identified patent and that said Letters Patent is hereby corrected as shown below:

In the Claims

In Claim 15, Column 22, Line 22 delete "receiving, receiving," and insert -- receiving, --, therefor.

Signed and Sealed this
Seventh Day of July, 2020

Andrei Iancu
*Director of the United States Patent and Trademark Office*